US008217872B2

(12) United States Patent
Itoh et al.

(10) Patent No.: US 8,217,872 B2
(45) Date of Patent: Jul. 10, 2012

(54) ACTIVE MATRIX SUBSTRATE, AND LIQUID CRYSTAL DISPLAY DEVICE

(75) Inventors: Ryohki Itoh, Osaka (JP); Satoshi Horiuchi, Osaka (JP); Takaharu Yamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 239 days.

(21) Appl. No.: 12/746,377

(22) PCT Filed: Dec. 26, 2008

(86) PCT No.: PCT/JP2008/073801
§ 371 (c)(1),
(2), (4) Date: Jun. 4, 2010

(87) PCT Pub. No.: WO2009/104346
PCT Pub. Date: Aug. 27, 2009

(65) Prior Publication Data
US 2010/0277447 A1      Nov. 4, 2010

(30) Foreign Application Priority Data
Feb. 21, 2008   (JP) .................................. 2008-040101

(51) Int. Cl.
*G09G 3/36*      (2006.01)
(52) U.S. Cl. ............. 345/87; 345/90; 345/92; 345/204; 345/205; 349/37; 349/41; 349/42; 349/138
(58) Field of Classification Search .................... 345/84, 345/87, 88, 90, 95, 204, 205, 690; 349/37, 349/38, 41–43, 106, 110, 138
See application file for complete search history.

(56) References Cited

U.S. PATENT DOCUMENTS

| 6,259,493 | B1 | 7/2001 | Nakamura et al. |
| 7,196,745 | B2 * | 3/2007 | Enda et al. ..................... 349/38 |
| 7,440,039 | B2 * | 10/2008 | Enda et al. ..................... 349/38 |
| 7,535,519 | B2 * | 5/2009 | Lin ..................... 349/38 |
| 2002/0003588 | A1 | 1/2002 | Okada et al. |
| 2004/0017521 | A1 | 1/2004 | Okada et al. |
| 2005/0046764 | A1 | 3/2005 | Enda et al. |
| 2006/0087609 | A1 | 4/2006 | Lee |
| 2007/0109456 | A1 | 5/2007 | Enda et al. |

FOREIGN PATENT DOCUMENTS

| JP | 6-308533 A | 11/1994 |
| JP | 8-160451 A | 6/1996 |
| JP | 2001-281696 A | 10/2001 |
| JP | 2005-99733 A | 4/2005 |
| JP | 2006-126772 A | 5/2006 |

* cited by examiner

*Primary Examiner* — Quan-Zhen Wang
*Assistant Examiner* — Jennifer Nguyen
(74) *Attorney, Agent, or Firm* — Birch, Stewart, Kolasch & Birch, LLP

(57) ABSTRACT

The present invention provides a liquid crystal display device including an active matrix substrate with improved characteristics and providing high-contrast between black and white displays. The active matrix substrate of the present invention is an active matrix substrate, including:
  pixel electrodes arranged in a matrix pattern;
  a source line extending in a column direction and overlapping with any adjacent two of the pixel electrodes in a row direction; and
  a storage capacitor line extending in the row direction and intersecting with the source line,
  wherein the pixel electrodes, the source line, and the storage capacitor line are disposed in different layers stacked with an insulating film therebetween,
  the source line has bend points below both of the adjacent two row pixel electrodes and has a crossing portion passing across a space between the adjacent two row pixel electrodes,
  the storage capacitor line has a portion extending in the column direction and overlapping with the space between the adjacent two row pixel electrodes, and
  the source line overlaps with the storage capacitor line substantially only at an intersection thereof.

48 Claims, 16 Drawing Sheets

(a)

(b)

ACTIVE MATRIX SUBSTRATE, AND LIQUID CRYSTAL DISPLAY DEVICE

TECHNICAL FIELD

The present invention is directed to active matrix substrates and LCD (liquid crystal display) devices. More particularly, the present invention is directed to an LCD device for use in active matrix driving, particularly suitably in reverse polarity driving.

BACKGROUND ART

LCD devices are being widely used in a variety of fields such as televisions, personal computers, cellular phones, and digital cameras because of their characteristics, such as thin profile, lightweight, and low power consumption. According to LCD devices, optical properties such as birefringence, optical rotation, dichroism, and optical rotatory dispersion of light used for display are adjusted by controlling LC orientation by voltage application. The LCD devices are further classified based on the kind of LC drive control system. In matrix display devices, for example, electrodes are disposed in a specific pattern, and the electrodes independently control driving of LCs, which allows high-resolution image display.

Examples of the matrix display devices include passive matrix display devices and active matrix display devices. According to active matrix display devices, electrodes are disposed in a matrix pattern and lines are disposed in two mutually perpendicular directions to surround each of the electrodes. Further, a switching element is disposed at each of the intersections, and this enables the respective electrodes to be separately drive-controlled by the lines. Thus the active matrix display devices can provide high-quality display when being large-capacity devices.

Various developments on the active matrix LCD devices have been made in order to improve the display qualities, as disclosed in Patent Documents 1 to 3, for example.

An LCD device of Patent Document 1 is an AMLCD (active matrix liquid crystal display) device that is configured to include in sequence, a pixel electrode substrate, a liquid crystal layer, and a counter electrode substrate. The pixel electrode substrate is provided with pixel electrodes each of which is surrounded by mutually-perpendicular gate bus lines and drain bus lines. Further, the device includes storage capacitor electrodes as a light-shielding film on the pixel electrode substrate to prevent light leakage from spaces between the pixel electrodes and the drain bus lines, thereby minimizing margin of the light-shielding film. As a result, the LCD device has an improved aperture ratio. In Patent Document 1, a signal voltage is supplied through the drain bus line.

An LCD element of Patent Document 2 is an AMLCD element, and pixel electrodes, scanning electrode lines and signal electrode lines are disposed on one substrate constituting the LCD element, the two lines being disposed in a lattice pattern to surround each of the pixel electrodes. A light-shielding conductor extended from the scanning electrode line is disposed toward a thin film transistor along the signal electrode line, and this conductor is used to prevent light leakage from spaces between the pixel electrodes and the scanning electrode lines and also spaces between the pixel electrodes and the signal electrode lines. Thus, light leakage can be suppressed regardless of whether or not a black matrix is precisely positioned with the spaces, and the area of the black matrix also can be decreased. As a result, the LCD element has an improved aperture ratio.

An LCD device of Patent Document 3 is an AMLCD device, and one of a pixel electrode and a signal line has a bent part and at the bent part, the pixel electrodes in the width direction are covered. Thus, when the pixel electrode or the signal line has the bent part, a variation in capacitance formed between the pixel electrode and the signal line (source line), caused by misalignment between layers, can be suppressed even when the LCD device is driven by dot-reversal driving where a polarity of a source signal is reversed based on every gate line. As a result, display unevenness called shadowing, caused by the capacitance variation, can be minimized.

The LCD devices are now being rapidly developed, and in addition to the improvement in aperture ratio, improvements in black-white contrast for more excellent display qualities and characteristics of active matrix substrates of the LCD devices are desired for the LCD devices.

[Patent Document 1]
Japanese Kokai Publication No. Hei-06-308533
[Patent Document 2]
Japanese Kokai Publication No. Hei-08-160451
[Patent Document 3]
Japanese Kokai Publication No. 2001-281696

DISCLOSURE OF INVENTION

The present invention has been made in view of the above-mentioned state of the art. The present invention has an object to provide an LCD device including an active matrix substrate with improved characteristics and providing high-contrast between black and white displays.

The prevent inventors made various investigations on configurations of improving characteristics of an active matrix substrate including a source line having a bend point and also improving display qualities of an LCD device including such an active matrix substrate. Then the inventors noted locations of pixel electrodes and source lines. The inventors found the followings. According to conventional configurations, pixel electrodes, each of which has a rectangular shape, are disposed in a matrix (lattice) pattern, and spaces between the pixel electrodes are light-shielded by mutually-perpendicular gate lines and source lines. In this configuration, display unevenness caused by in-plane misalignment can be eliminated by the bend part-including source line, but in this case, some spaces between the pixel electrodes might be insufficiently light-shielded to cause light leakage therefrom in black display state. The inventors also found that the light leakage between the pixel electrodes can be prevented by disposing some line or electrode at the light leakage region to overlap with the spaces between the pixel electrodes, which is allowed also in reverse polarity driving AMLCD devices.

The present inventors found that a storage capacitor line or a gate line included in an active matrix substrate can be used as the line or electrode for light shielding, and further found that a source line is spaced from the storage capacitor line or the gate line with a certain distance therebetween so as not to overlap therewith, thereby minimizing a parasitic capacitance formed therebetween, and as a result, signal delay can be prevented. Further, the inventors found that according to LCD devices including this active matrix substrate, generation of signal delay can be prevented, and the suppressed light leakage between the pixel electrodes contributes to an improvement in contrast. As a result, the above-mentioned problems have been admirably solved, leading to completion of the present invention.

The present invention is an active matrix substrate, including:
  pixel electrodes arranged in a matrix pattern;
  a source line extending in a column direction and overlapping with any adjacent two of the pixel electrodes in a row direction; and
  a storage capacitor line extending in the row direction and intersecting with the source line,
  wherein the pixel electrodes, the source line, and the storage capacitor line are disposed in different layers stacked with an insulating film therebetween,
  the source line has bend points below both of the adjacent two row pixel electrodes and has a crossing portion passing across a space between the adjacent two row pixel electrodes,
  the storage capacitor line has a portion extending in the column direction and overlapping with the space between the adjacent two row pixel electrodes, and
  the source line overlaps with the storage capacitor line substantially only at an intersection thereof (hereinafter, also referred to as a first active matrix substrate of the present invention).

The first active matrix substrate of the present invention is mentioned in more detail below.

The first active matrix substrate of the present invention includes: pixel electrodes arranged in a matrix pattern; a source line extending in a column direction and overlapping with any adjacent two of the pixel electrodes in a row direction; and a storage capacitor line extending in the row direction and intersecting with the source line. The first active matrix substrate of the present invention is provided with a variety of electrodes and lines for LC driving, such as pixel electrodes, source lines, gate lines, and storage capacitor lines. On the substrate including these electrodes and lines, gate lines are disposed in a row direction, i.e., in an extending direction of the storage capacitor line to intersect with the source lines, and at each intersection of the two lines, a TFT (thin film transistor), which is a switching element, and the like, is provided. The pixel electrodes each constitute a pixel unit for applying a voltage to the LC layer and functions as one pixel for driving LCs. The source lines each supply a source signal to the pixel electrode or the TFT. The storage capacitor lines each form a capacitance together with another electrode or line disposed with an insulating film therebetween to store an electric potential of the pixel electrode when the TFT is off. The gate lines each control a timing of signal data application to the pixel electrode and the TFT. The TFTs are three-terminal semiconductor switching elements and each can control a gate signal fed from the gate line and a source signal fed from the source line. The locations of the gate lines, the source lines, and the TFTs allow line sequential driving where a signal voltage is sequentially applied to the pixel electrodes along the gate line.

The pixel electrodes, the source line, and the storage capacitor line are disposed in different layers stacked with an insulating film therebetween, and the source line has bend points below both of the adjacent two row pixel electrodes and has a crossing portion passing across a space between the adjacent two row pixel electrodes. According to the present invention, the source line is disposed in a different layer from the pixel electrode with an insulating film therebetween, and a certain capacitance is formed between the source line and the pixel electrode, as the storage capacitor lines do. The source line is disposed in the row direction on the whole as mentioned above, but bends at least twice at the respective bend points, and the crossing portion, which is a portion between the bend points, passes across a space between the adjacent two row pixel electrodes. At the bend point, the source line bends at a right angle or obliquely to the longitudinal direction of the source line. As a result, the source line can overlap with each of the adjacent two row pixel electrodes.

The meaning of providing the source line with the bend points to overlap with both of the adjacent two row pixel electrodes is mentioned below. FIGS. 15 and 16 are plan views each schematically showing a relationship between locations of pixel electrodes and source lines, and a capacitance formed therebetween. FIG. 16 shows a conventional embodiment where the source lines have no bend points. FIG. 15 shows an embodiment of the present invention where the source lines each have bend points. FIGS. 15(a) and 16(a) show the relationship without misalignment. FIGS. 15(b) and 16(b) show the relationship with misalignment. The shaded portions in FIGS. 15 and 16 each show an overlapping region of the source line and the pixel electrode. As shown in FIG. 16, when pixel electrodes (pix1 to pix3) are disposed in a matrix pattern, source lines (S1 to S3) are usually arranged to overlap with respective spaces between the pixel electrodes. The layer including the pixel electrodes and the layer including the source lines are separated, and an insulating film is formed therebetween. So a certain capacitance is formed between the pixel electrode and the source line. However, the source line is not always disposed to pass the center of the space between the pixel electrodes as shown in FIG. 16(b), for example, because the pixel electrodes and the source lines are disposed in different layers. The amount of the capacitance is proportional to an area of overlaps between the source line and the pixel electrode. So a large variation in the area causes the following problems, for example, when a polarity is reversed between adjacent pixel electrodes.

In LCD devices, a capacitance $C_{pix}$, which a pixel electrode forms, is a sum of $C_{cs}$ formed with a storage capacitor line, $C_{lc}$ formed in an LC layer, $C_{sd}$ formed with a source line, $C_{gd}$ formed between gate and drain lines, and the like, as shown in the following formula (1).

$$C_{pix} = C_{cs} + C_{cl} + C_{sd} + C_{gd} \tag{1}$$

Pixel electric potential $V_{pix1}$ can be represented by the following formula (2).

$$V_{pix1} = V_{s1} C_{sd1} / C_{pix1} \times V_{s1}pp) + (C_{sd2}/C_{pix1} \times V_{s2}pp)) \tag{2}$$

where S1 represents source line overlapping with one side of pixel electrode pix1;

S2 represents source line overlapping with another side of pixel electrode pix1;

$V_{s1}$ and $V_{s2}$ represent source electric potentials applied by S1 and S2, respectively;

$C_{pix1}$ represents capacitance, which pix1 forms;

$C_{sd1}$ and $C_{sd2}$ represent capacitances formed between pix1 and S1 and between pix1 and S2, respectively;

pix1 receives signal electric potential from S1;

pix1 has a polarity of plus; and pix2 has a polarity of minus.

$V_{s2} = -V_{s1}$ is satisfied because the adjacent pixels are different in polarity. "$(C_{sd1}/C_{pix1} \times V_{s1}pp) + (C_{sd2}/C_{pix1} \times V_{s2}pp)$" shows a drawn voltage drawn by S1 and S2.

In this case, the polarity of a source electric potential applied to the pixel electrode is reversed every 1H period, and so influences equivalent to twice the source electric potential act on the pixel electrode. Thus, the source electric potentials $V_{s1}pp$ and $V_{s2}pp$ equivalent of the drawing voltages satisfy $V_{s1}pp = 2 \times V_{s1}$ and $V_{s2}pp = 2 \times V_{s2}$.

Similarly, pixel electric potential $V_{pix2}$ can be represented by the following formula (3).

$$V_{pix2}=V_{s2}(C_{sd2}/C_{pix2}\times V_{s2}pp)+(C_{sd3}/C_{pix2}\times V_{s3}pp) \quad (3)$$

where S2 represents source line overlapping with one side of pixel electrode pix2;

S3 represents source line overlapping with another side of pixel electrode pix2;

$V_{s2}$ and $V_{s3}$ represent source electric potentials applied by S2 and S3, respectively;

$C_{pix2}$ represents capacitance, which pix2 forms; formed in pix2;

$C_{sd2}$ and $C_{sd3}$ represent capacitances formed between pix2 and S2 and between pix3 and S3, respectively;

pix2 receives signal potential from S2; and pix3 adjacent to pix2 has polarity of plus.

$V_{s3}=-V_{s2}$ is satisfied because the adjacent pixels are different in polarity. "$(C_{sd2}/C_{pix2}\times V_{s2}pp)+(C_{sd3}/C_{pix2}\times V_{s3}pp)$" represents a drawn voltage drawn by S2 and S3.

In view of the above, when the polarity is different between adjacent two pixels and when an area where the source line overlaps with the pixel electrode is the same between the adjacent two pixels, as shown in FIG. 16(a), $C_{sd1}=C_{sd2}=C_{sd3}$ is satisfied, and voltages drawn by the source lines can be mutually cancelled among the pixels, and the adjacent two pixels are the same in electric potential (polarities of which may be different). However, as shown in FIG. 16(b), when the overlapping area is varied among the pixels, $C_{sd1}>C_{sd2}$ or $C_{sd1}<C_{sd2}$ is satisfied or $C_{sd2}>C_{sd3}$ or $C_{sd2}<C_{sd3}$ is satisfied, and voltage drawn by the source line changes are also varied and the adjacent two pixels have different potentials, resulting in display unevenness.

In the present invention, as shown in FIGS. 15(a) and 15(b), the source line is provided with the bend points to overlap with each of the adjacent two pixel electrodes, which easily enables almost the entire source line to overlap with the pixel electrodes. According to this, the adjacent two pixels have the same potential even if slight misalignment occurs as shown in FIG. 15(b). Specifically, almost equivalent values are easily given to $C_{sd1}$, $C_{sd2}$ and $C_{sd3}$ in the embodiment of the present invention.

The storage capacitor line has a portion extending in the column direction and overlapping with the space between the adjacent two row pixel electrodes. When it is designed that part of the source line is bent and thereby the entire source line overlaps with the pixel electrodes, a space between the pixel electrodes has a region free from the light-shielding member. Through this region, light is leaked in black display state, and a contrast ratio calculated by "luminance in white display state/luminance in black display" is decreased. In the present invention, it is designed that part of the storage capacitor line is branched and then extended to overlap with a space between the pixel electrodes, and thereby light through the space is blocked to reduce light leakage in black display state and the contrast ratio can be improved. Black matrix made of organic resins and the like can be commonly used as the light-shielding member, but black matrix and the source line are typically disposed in different substrates, and sufficient light-shielding effects might not be obtained if misalignment between the two substrates occurs. In addition, light might be leaked through a pin-hole possibly formed in the black matrix. In contrast to the black matrix, the storage capacitor line can be easily disposed on the substrate including the source line. So use of the storage capacitor line as the light-shielding member can minimize influences by the misalignment. Further, metal films show much light-shielding property than organic resins do. Accordingly, these lines are more suitable as the light-shielding member of the present invention.

The source line overlaps with the storage capacitor line substantially only at an intersection thereof. In the present invention, most portion of the source line is apart from the storage capacitor line so as not to overlap therewith, in order to avoid signal delay and the like possibly caused due to a parasitic capacitance formed therebetween. In the present invention, the storage capacitor line and the source line are designed to be intersected with each other, and so the two lines are overlapped with each other at least at one point. According to the embodiment where the source line overlaps with the storage capacitor line substantially only at the intersection thereof, as in the present invention, formation of parasitic capacitance can be sufficiently reduced, leading to suppression of signal delay.

The configuration of the active matrix substrate of the present invention is not especially limited. The active matrix substrate may or may not include other components as long as it essentially includes the above-mentioned components.

The active matrix substrate of the present invention can be mounted on a variety of display devices and sensors, for example. Examples of the display devices include LCD devices and organic EL displays. Examples of the sensors include photo sensors, magnetic sensors, temperature sensors, and chemical sensors.

In the first active matrix substrate of the present invention, a gate line may be used as the extending portion instead of the storage capacitor line. The present invention is an active matrix substrate, including:

pixel electrodes arranged in a matrix pattern;

a source line extending in a column direction and overlapping with any adjacent two of the pixel electrodes in a row direction; and a gate line extending in the row direction and intersecting with the source line, wherein the pixel electrodes, the source line, and the gate line are disposed in different layers stacked with an insulating film therebetween, the source line has bend points below both of the adjacent two row pixel electrodes and has a crossing portion passing across a space between the adjacent two row pixel electrodes, the gate line has a portion extending in the column direction and overlapping with the space between the adjacent two row pixel electrodes, and the source line overlaps with the gate line substantially only at an intersection thereof (hereinafter, also referred to as a second active matrix substrate of the present invention).

According to this embodiment in which the gate line is extended, unlike the embodiment where the storage capacitor line is extended, a voltage change from a previous gate signal momentarily gives an influence on a capacitance formed between the gate line and the pixel electrode, but in view of light shielding and signal delay, the same advantages as in the use of the storage capacitor line can be obtained.

In the first active matrix substrate of the present invention, a floating electrode may be used in stead of the storage capacitor line. The present invention is also an active matrix substrate, including:

pixel electrodes arranged in a matrix pattern; and a source line extending in a column direction and overlapping any adjacent two of the pixel electrodes in a row direction, wherein the pixel electrodes and the source line are disposed in different layers with an insulating film therebetween, the source line has bend points below both of the adjacent two row pixel electrodes and has a crossing portion passing across a space between the adjacent two row pixel electrodes, and the active matrix substrate includes a floating electrode extending in the column direction and overlapping with the space between the adjacent two row pixel electrodes (hereinafter, also referred to as a third active matrix substrate of the present invention). According to this, the same advantages as in the use of the storage capacitor line or the gate line can be obtained in view of light-shielding and signal delay.

The floating electrode is an electrode independent from and not connected to other lines such as the storage capacitor line and the gate line. The materials for the storage capacitor lines or the gate lines may be used for the floating electrode. This allows simplification of the production steps. A parasitic capacitance formed between the source line and the floating electrode possibly causes signal delay, as the parasitic capacitance formed between the source line and the storage capacitor line or the gate line does. Thus it is preferable that the source line overlaps with the floating electrode substantially only at an intersection thereof, and it is more preferable that the source line does not substantially overlap with the floating electrode.

Preferable embodiments of the first to third active matrix substrates of the present invention are mentioned in more detail below.

It is preferable that the adjacent two row pixel electrodes are different in polarity. Specifically, according to the present embodiment, one of adjacent two pixel electrodes has a polarity of plus and the other has a polarity of minus, and the source line overlaps with each of the two pixel electrodes with the different polarities through the bending points. Dot-reversal driving may be employed for example, as this driving system in order to apply voltages with different polarities to respective adjacent two pixel electrodes. In dot-reversal driving, the pixel electrodes are disposed so that a polarity of plus and a polarity of minus are alternated in both of the vertical and transverse directions in order of plus, minus, plus, minus. According to the present invention, the polarity is reversed between adjacent two pixel electrodes, and so, for example, at least any two of the pixel electrodes in the row and column directions are disposed so that their polarities are in order of plus, minus, minus, plus or in order of minus, plus, plus, minus. Thus when the adjacent two pixel electrodes are different in polarity, generation of flicker can be effectively suppressed. The advantages of the present invention are particularly exhibited in this driving system where voltages with different polarities are applied to the respective adjacent two pixel electrodes. Even when slight misalignment occurs, the pixel electrodes can show almost the same electric potential, and thereby deterioration in display qualities can be prevented.

Preferable embodiments of the first active matrix substrate of the present invention where the storage capacitor line is extended are mentioned below. Below given are preferable embodiments of the first active matrix substrate including a gate line extending in the row direction and intersecting with the source line.

It is preferable that the gate line has a portion extending in the column direction and overlapping with the space between the adjacent two row pixel electrodes. Specifically, according to the present Embodiment, the space in the column direction between the adjacent two pixel electrodes is overlapped by the respective extending portions of the storage capacitor line and the gate line. By using use both of the storage capacitor line and the gate line as the light-shielding member, the light-shielded region can be sufficiently secured and a storage capacitance in a proper amount can be formed.

It is preferable that the gate line and the storage capacitor line are disposed in the same layer. As mentioned above, the storage capacitor line and the gate line are provided with a role as a light-shielding member, in addition to their original roles, and the same materials may be used for the gate line and the storage capacitor line. So in this embodiment, the storage capacitor line and the gate line can be formed at a time, which simplifies the production steps.

It is preferable that the gate line and the storage capacitor line are disposed in different layers with an insulating film therebetween. Generally, leakage defects between lines disposed in the same layer may occur. This embodiment decreases a possibility of generation of such leakage defects. According to the above-mentioned embodiment, it is preferable that the space between the adjacent two row pixel electrodes overlaps with at least one of the gate line and the storage capacitor line. According to this embodiment, the gate line and the storage capacitor line may be disposed to partly overlap with each other, and every space in the row direction between adjacent ones of the pixel electrodes can be light-shielded by either the gate line or the storage capacitor line. So light leakage between the pixel electrodes can be more surely prevented. For example, display devices including the active matrix substrate of the present Embodiment can provide higher-contrast display.

It is preferable that the gate line is disposed to overlap with a space between any adjacent two of the pixel electrodes in the column direction. According to the present Embodiment, not only spaces in the row direction but also spaces in the column direction between adjacent pixel electrodes can be light-shielded. So light leakage between the pixel electrodes can be more surely prevented. For example, display devices including the active matrix substrate of the present Embodiment can provide higher-contrast display.

It is preferable that the storage capacitor line is disposed to overlap with a space between any adjacent two of the pixel electrodes in the column direction. For example, when the gate line is disposed to overlap with the pixel electrodes, not in the space between the adjacent two column pixel electrodes, this embodiment allows light leakage between the adjacent two column pixel electrodes to be more surely prevented. For example, display devices including the active matrix substrate of the present Embodiment can provide higher-contrast display.

Below given are preferable embodiments of the first active matrix substrate of the present invention further including a floating electrode overlapping with the space between the adjacent two row pixel electrodes.

It is preferable that the floating electrode and the storage capacitor line are disposed in the same layer. According to this embodiment, the storage capacitor line and the floating electrode can be formed at a time, which can simplify the production steps.

It is preferable that the floating electrode and the storage capacitor line are disposed in different layers with an insulating film therebetween and that the space between the adjacent two row pixel electrodes overlaps with at least one selected from the floating electrode, the storage capacitor line, and the gate line. According to the present Embodiment, every space in the row direction between adjacent ones of the pixel electrodes can be light-shielded by any of the floating electrode, the storage capacitor line, and the gate line. As a result, this embodiment allows light leakage between the adjacent two column pixel electrodes to be more surely prevented. For example, display devices including the active matrix substrate of the present Embodiment can provide higher-contrast display.

Below mentioned are preferable embodiments of the second active matrix substrate where the gate line is extended. Preferable embodiments of the second active matrix substrate are the same as in the first active matrix substrate. The storage capacitor line of the first active matrix substrate is replaced with the gate line. The embodiments where the floating electrode is used, mentioned in the first active matrix substrate, can be also applied to the second active matrix substrate.

The following embodiments are preferable when the second active matrix substrate further includes a storage capacitor line extending in the row direction and intersecting with the source line.

It is preferable that the storage capacitor line has a portion extending in the column direction and overlapping with the space between the adjacent two row pixel electrodes. According to this, both of the gate line and the storage capacitor line can be used as the light-shielding member. The light-shielded region can be sufficiently secured, and a storage capacitance in a proper amount can be formed.

It is preferable that the storage capacitor line and the gate line are disposed in the same layer. According to this, the gate line and the storage capacitor line can be formed at a time, and so the production steps can be simplified.

It is preferable that the storage capacitor line and the gate line are disposed in different layers with an insulating film therebetween. Generally, leakage defects between lines disposed in the same layer may occur. This embodiment decreases a possibility of generation of such leakage defects. In the present Embodiment, it is preferable that the space between the adjacent two row pixel electrodes overlaps with at least one of the storage capacitor line and the gate line. According to this, every space in the row and column directions between adjacent two pixel electrodes can be light-shielded by either the storage capacitor line or the gate line. So light leakage between the pixel electrodes can be more surely prevented. For example, display devices including the active matrix substrate of the present Embodiment can provide higher-contrast display.

It is preferable that the storage capacitor line is disposed to overlap with a space between any adjacent two of the pixel electrodes in the column direction. According to this, not only spaces in the row direction but also spaces in the column direction between adjacent ones of the pixel electrodes can be light-shielded. So light leakage between the pixel electrodes can be more surely prevented. For example, display devices including the active matrix substrate of the present Embodiment can provide higher-contrast display.

It is preferable that the gate line is disposed to overlap with a space between any adjacent two of the pixel electrodes in the column direction. For example, when the storage capacitor line is disposed to overlap with the pixel electrodes, not in the space between the adjacent two column pixel electrodes, this embodiment allows light leakage between the adjacent two column pixel electrodes to be more surely prevented. For example, display devices including the active matrix substrate of the present Embodiment can provide higher-contrast display.

The following embodiments are preferable when the second active matrix substrate further includes a floating electrode overlapping with the space between the adjacent two row pixel electrodes.

It is preferable that the floating electrode and the gate line are disposed in the same layer. As a result, the gate line and the floating electrode can be formed at a time, which can simplify the production steps.

It is preferable that the floating electrode and the gate line are disposed in different layers with an insulating film therebetween. Generally, leakage defects between lines disposed in the same layer may occur. This embodiment decreases a possibility of generation of such leakage defects. According to the above-mentioned embodiment, it is preferable that the space between the adjacent two row pixel electrodes overlaps with at least one selected from the floating electrode, the gate line, and the storage capacitor line. According to the present Embodiment, every space in the row direction between adjacent ones of the pixel electrodes can be light-shielded by any of the floating electrode, the gate line, and the storage capacitor line. As a result, this embodiment allows light leakage between the pixel electrodes to be more surely prevented. For example, display devices including the active matrix substrate of the present Embodiment can provide higher-contrast display.

Below given are preferable embodiments of the third active matrix substrate including the floating electrode. Preferable embodiments of the third active matrix substrate are the same as in the first and second active matrix substrates. The storage capacitor line of the first active matrix substrate and the gate line of the second active matrix substrate are replaced with the floating electrode.

Preferable are the following embodiments when the third active matrix substrate further includes a storage capacitor line extending in the column direction and intersecting with the source line.

It is preferable that the storage capacitor line has a portion extending in the column direction and overlapping with the space between the adjacent two row pixel electrodes. According to this, both of the floating electrode and the storage capacitor line can be used as the light-shielding member. So the light-shielded region can be sufficiently secured, and a storage capacitance in a proper amount can be formed.

It is preferable that the storage capacitor line and the floating electrode are disposed in the same layer. As a result, the floating electrode and the storage capacitor line can be formed at a time, which can simplify the production steps.

It is preferable that the storage capacitor line and the floating electrode are disposed in different layers with an insulating film therebetween. Generally, leakage defects between lines disposed in the same layer may occur. This embodiment decreases a possibility of generation of such leakage defects. Further, according to the present Embodiment, it is preferable that the space between the adjacent two row pixel electrodes overlaps with at least one of the storage capacitor line and the floating electrode. According to this, every space in the row direction between adjacent ones of the pixel electrodes can be light-shielded by either the storage capacitor line or the floating electrode. As a result, this embodiment allows light leakage between the pixel electrodes to be more surely prevented. For example, display devices including the active matrix substrate of the present Embodiment can provide higher-contrast display.

It is preferable that the storage capacitor line overlaps with a space between any adjacent two of the pixel electrodes in the column direction. According to this, not only spaces in the row direction but also spaces in the column direction between adjacent ones of the pixel electrodes can be light-shielded. So light leakage between the pixel electrodes can be more surely prevented. For example, display devices including the active matrix substrate of the present Embodiment can provide higher-contrast display.

The following embodiments are preferable when the third active matrix substrate of the present invention further includes a gate line extending in the row direction and intersecting with the source line.

It is preferable that the gate line has a portion extending in the column direction and overlapping with the space between the adjacent two row pixel electrodes. According to this, both of the floating electrode and the gate line can be used as the light-shielding member. So the light-shielded region can be sufficiently secured, and a storage capacitance in a proper amount can be formed.

It is preferable that the gate line and the floating electrode are disposed in the same layer. As a result, the floating electrode and the storage capacitor line can be formed at a time, which can simplify the production steps.

It is preferable that the gate line and the floating electrode are disposed in different layers with an insulating film therebetween. Generally, leakage defects between lines disposed in the same layer may occur. This embodiment decreases a possibility of generation of such leakage defects. According to the present Embodiment, it is also preferable that the space between the adjacent two row pixel electrodes overlaps with at least one of the gate line and the floating electrode. According to this, every space in the row and column directions between adjacent two pixel electrodes can be light-shielded by either the gate line or the floating electrode. So light leakage between the pixel electrodes can be more surely prevented. For example, display devices including the active matrix substrate of the present Embodiment can provide higher-contrast display.

It is preferable that the gate line overlaps with a space between any adjacent two of the pixel electrodes in the column direction. According to this, not only spaces in the row direction but also spaces in the column direction between adjacent ones of the pixel electrodes can be light-shielded. So light leakage between the pixel electrodes can be more surely prevented. For example, display devices including the active matrix substrate of the present Embodiment can provide higher-contrast display.

The prevent invention is also a liquid crystal display device including the first, second, or third active matrix substrate, a liquid crystal layer, and a counter substrate, stacked in this order, wherein the counter substrate includes a black matrix overlapping with a space between any adjacent two of the pixel electrodes. Display devices including the first, second, or third active matrix substrate can provide high-contrast between black and white displays even if being driven in reverse polarity driving. The display device is particularly preferably an LCD device including a black matrix.

In addition to the above-mentioned lines, a black matrix may be subsidiarily used as a member for light-shielding spaces in the row and/or column directions between adjacent pixel electrodes. Even if a variety of lines are used for light-shielding as mentioned above, some lines might be not suitably used in view of the line design. In such a case, a black matrix is used instead, thereby further improving the contrast.

The liquid crystal display device of the present invention includes an LC layer interposed between a pair of substrates, i.e., an active matrix substrate and a counter substrate. The counter substrate can be used, for example, as a color filter substrate including a color filter layer and a black matrix. LCD devices commonly include a black matrix for preventing light leakage between color filters, color mixing, and the like, but in the present invention, a variety of lines serve as a main light-shielding member, and so the LCD device of the present invention includes a thinner black matrix than conventional one and therefore shows a higher aperture ratio.

EFFECT OF THE INVENTION

According to the active matrix substrate of the present invention, a storage capacitor line and/or a gate line is extended to overlap with a space between adjacent two pixel electrodes, and light leakage in black state through the space can be suppressed also when a source line has bend points. So display devices including this active matrix substrate can provide improved-contrast display. Further, the extended storage capacitor line or gate line is disposed so as not to overlap with the source line, except for at the intersection thereof, and so formation of a parasitic capacitance between these lines can be prevented, and influences of signal delay can be minimized.

BEST MODES FOR CARRYING OUT THE INVENTION

The present invention is mentioned in more detail below with reference to drawings showing embodiments of the present invention but not limited only thereto.

Embodiment 1

FIG. 1 is a plan view schematically showing a pixel configuration of an LCD device of Embodiment 1. FIG. 2 is a schematic cross-sectional view taken along line A-B of FIG. 1. The LCD device of Embodiment 1 includes a pair of substrates, i.e., an active matrix substrate including pixel electrodes and a color filter substrate including color filter layers, and an LC layer interposed between these substrates. According to the active matrix substrate of the LCD device of Embodiment 1, pixel electrodes 11 (shown by the thick line) are arrayed in a matrix pattern, and driving of LCs is controlled on every pixel electrode 11 basis.

According to the active matrix substrate of Embodiment 1, various lines such as gate lines 12 and source lines 13 are arranged in separate layers with an insulating film therebetween, separately from the layer including the pixel electrodes. The gate lines 12 extend in the row direction along a side of the pixel electrodes 11 in the row direction to overlap with spaces between the two pixel electrodes 11 adjacent in the column direction. The source lines 13 extend in the column direction to intersect with the gate wirings 12 with an insulating film therebetween. At each intersection between the gate lines 12 and the source lines 13, a TFT 14, which is a pixel switching element, is disposed. The TFT 14 controls a timing of a source signal based on a gate signal fed from the gate wiring 12 to send the source signal fed from the source line 13 to the pixel electrode 11.

Specifically, the TFT 14 is connected to both of the gate line 12 and the source line 13, and a drain-drawing line 15 is extended from one electrode of the TFT 14 toward the center of the pixel. An insulating film overlapping with the drain-drawing line 15 is provided with a contact hole 16, and through this hole 16, the drain-drawing line 15 and the pixel electrode 11 are electrically connected to each other. This configuration is provided in every pixel.

According to Embodiment 1, CS lines (storage capacitor lines) 17 are disposed to extend in the row direction between the gate lines 12. Each of the CS lines 17 is disposed to overlap with the drain-drawing line 15 of the TFT 14 with an insulating film therebetween at the center of the pixel, and forms a certain storage capacitance together with the drain-drawing line 15 of the TFT 14. Examples of materials for the various lines such as the gate line 12, the source line 13, the CS line 17, and the drain-drawing line 15 include aluminum (Al), silver (Ag), tantalum nitride (TaN), titanium nitride (TiN), and molybdenum nitride (MoN).

As shown in FIG. 2, the active matrix substrate of Embodiment 1 includes a glass substrate 21, the CS lines 17, a first insulating film 22, the source lines 13, a second insulating film 23, and the pixel electrodes 11, stacked in this order toward the LC layer. The gate lines 12 and the CS lines 17 are disposed in the same layer in Embodiment 1.

In Embodiment 1, the source line 13 has bending points 18 below each of two pixel electrodes 11 adjacent in the row direction, and has a crossing portion 20 between the bending points 18. This crossing portion 20 passes across a space between the adjacent row pixel electrodes 11. Thus each source line 13 is arranged to overlap with both of the adjacent row pixel electrodes 11. More specifically, the crossing portion 20 of the source line 13 extends in a direction oblique to both sides in the column and row directions constituting the outer circumference of the pixel electrode 11. According to Embodiment 1, most portion of the source line 13 is overlapped with the pixel electrodes 11, and so even if misalignment occurs, an area of the overlap between the pixel electrode 11 and the source line 13 is almost the same between the adjacent pixel electrodes 11.

In Embodiment 1, the source lines 13 have the same pattern extending in the column direction to overlap with the adjacent two row pixel electrodes 11 as shown in FIG. 1. More specifically, according to Embodiment 1, each of the source lines 13 extends in the column direction, overlapping with a right one of adjacent two row pixel electrodes 11, and bends at a bend point 18 toward a left one to pass across a space between the row pixel electrodes 11. Then, the source line 13 bends again at a bend point 18 to extend in the column direction, overlapping with the left pixel electrode 11. The thus-extended source line 13 further bends at a right angle at a bend point 18 toward the right pixel electrode 11 and passes across the space to extend in the column. Then, the source line 13 bends again at a bend point 18 to extend in the column direction, overlapping with the right pixel electrode 11. Further, the source line 13 passes across another gate line 12 and extends toward a pair of pixel electrodes 11 in a next column. According to this, the pattern of the source line 13 formed to overlap with the pair of adjacent two row pixel electrodes 11 can be uniform among the pixels. So the other members such as the TFT 14 can be each disposed at the same location among the pixels. For example, a black matrix for light-shielding a channel of the TFT 14 also can be located at the same position among the pixels. As a result, an aperture ratio can be uniform between pixels adjacent in the column directions, which can suppress occurring of uneven brightness.

The location configuration of Embodiment 1 is advantageous particularly when one pixel electrode 11 has a polarity reverse to that of adjacent pixel electrode 11. When the polarity is different between the adjacent two pixel electrodes 11 and when an area of the overlap of the pixel electrode 11 and the source line 13 is largely different between the pixels, voltages drawn from the pixel electrodes 11 by the adjacent two source lines 13, becomes different. So by thus-disposing the crossing portion, the area of the overlap between the pixel electrode 11 and the source line 13 can be easily almost uniform between the adjacent pixel electrodes 11. As a result, the difference in drawn voltage is decreased and occurring of uneven brightness is suppressed, thereby maintaining display qualities in every pixel.

In Embodiment 1, each of the gate lines 12 is disposed to overlap with a space in the column direction between the pixel electrodes 11, i.e., a space between adjacent ones of the pixel electrodes in the column direction. Each of the source lines 13 is disposed to extend in the column direction but overlaps with the pixel electrodes 11. So spaces in the column direction between the pixel electrodes 11, i.e., spaces between adjacent ones of the pixel electrodes in the row direction, can have a region transmitting light, but in Embodiment 1, each of the spaces in the column direction is light-shielded by being overlapped by an extending portion 19 branched from the CS line 17. Thus the configuration of Embodiment 1 provides an LCD device providing high-contrast display. The gate lines 12 and the CS lines 17 may be formed by patterning a metal film that has been formed by sputtering and the like on the entire substrate by photolithography involving resist formation, exposure with mask, development, etching, removal of resist, and the like. The extending portion 19 can be also formed at the time of pattern formation of the CS line 17.

According to Embodiment 1, the source line 13 and the CS line 17 are basically spaced so as not to overlap with each other as viewed in the display face. The source line 13 and the CS line 17 overlap with each other substantially only at the intersection thereof. According to this, signal delay caused by a parasitic capacitance formed between the source line 13 and the CS line 17 can be suppressed, leading to stable display qualities. The source line 13 and the CS line 17 are designed to overlap with each other at some regions, but the number of these overlapping regions is decreased as much as possible, thereby minimizing influences on display qualities.

In Embodiment 1, the gate lines 12 and the CS lines 17 are disposed in the same layer. The same material may be used for the gate lines 12 and the CS lines 17, and so these lines can be formed at a time in the same layer, which simplifies the production steps. The gate lines 12 and the CS lines 17 can not be electrically connected to each other and disposed at a certain distance therebetween because of their different functions. Also in such an embodiment, other regions except for the space between the gate line 12 and the CS line can be sufficiently light-shielded. As a result, the effects of improving the contrast can be obtained.

According to Embodiment 1, the color filter substrate may be provided with a black matrix overlapping with spaces between the pixel electrodes 11. According to this, for example, even if the space between the pixel electrodes has a region that can not be overlapped with the CS line because of the line design, the black matrix can subsidiarily light-shield the region. Specifically, the black matrix is partially disposed to overlap with the space between the CS line 17 and the gate line 12. Thus, the light-shielding effects are improved, and the display device can provide improved-contrast display. Black matrices are typically disposed for the purpose of preventing light leakage, color mixing between color filters, and the like. In contrast to this, the display device of Embodiment 1 includes the variety of lines as a main light-shielding member and so can be provided with a black matrix thinner than usual. As a result, the display device can show an improved aperture ratio.

FIG. 3 is a plan view schematically showing polarities of pixel electrodes in the LCD device of Embodiment 1. The pixel electrodes 11 are driven by dot-reversal driving in Embodiment 1. According to dot-reversal driving, signals with reverse polarities are sequentially applied to two respective pixel electrodes adjacent in rows and columns. Accordingly, the pixel electrodes of Embodiment 1 are disposed so that polarities are reversed in order of plus, minus, plus, minus each in the row direction and the column direction, as shown in FIG. 3. The source line 13 bends to pass across a space between the pixel electrodes 11 with different polarities. The polarities can be switched by a gate driver connected to the gate lines 12 and a source driver connected to the source lines 13. According to dot-reversal driving, flicker can be effectively suppressed. According to the configuration of Embodiment 1, the display qualities can be maintained even if the polarity is different between adjacent two pixel electrodes 11. As a result, in addition to the flicker suppression, occurring of uneven brightness caused by a difference in luminance between adjacent pixel electrodes can be prevented, and further, light leakage between the adjacent pixel electrodes can be prevented to improve the contrast. Thus the reduction in display qualities, caused by signal delays, can be suppressed and high-quality images can be displayed.

Embodiment 2

FIG. 4 is a plan view schematically showing a pixel configuration of an LCD device of Embodiment 2. FIG. 5 is a schematic cross-sectional view taken along line C-D in FIG. 4. The LCD device of Embodiment 2 is the same as in Embodiment 1, except that gate lines 12 are used instead of the CS lines 17 as a member for light-shielding spaces between pixel electrodes 11. Each of the gate lines 12 of Embodiment 2 has an extending portion 29, which is part of the gate line 12 extended in the column direction of the pixel electrode 11, and this extending portion 29 overlaps with a space in the column direction of the pixel electrode 11 i.e., a space between the adjacent two row pixels. As a result, light leakage in black display state can be prevented, and improved contrast display can be provided. According to Embodiment 2, not the CS lines 17 but the gate lines 12 are each extended in the column direction of the pixel electrode 11, and so the CS lines 17 are each positioned not at the center of the pixel electrode 11 but closer to the end of the pixel electrode 11 to be extended in the row direction. The position of the overlap between the CS line 17 and the drain-drawing line 15 is not especially limited, and for example, the CS line 17 and the drain-drawing line 15 may be each extended to overlap with each other near at the center of the pixel electrode 11.

According to Embodiment 2, the source line 13 and the extending portion 29 of the gate line 12 are basically spaced so as not to overlap with each other as viewed in the display face. The source line 13 and the gate line 12 overlap with each other substantially only at the intersection thereof. Thus signal delay caused by a parasitic capacitance formed between the lines can be prevented, leading to stable display qualities.

As shown in FIG. 5, the active matrix substrate of Embodiment 2 includes a glass substrate 21, the gate lines 12, a first insulating film 22, the source lines 13, a second insulating film 23, and the pixel electrodes 11 in this order toward an LC layer.

Embodiment 3

FIG. 6 is a plan view schematically showing a pixel configuration of an LCD device of Embodiment 3. FIG. 7 is a schematic cross-sectional view taken along line E-F of FIG. 6. The LCD device of Embodiment 3 is the same as in Embodiment 1, except that in addition to CS lines 17, gate lines 12 are also used as the member for light-shielding spaces between adjacent two row pixel electrodes. Accordingly, also in Embodiment 3, the CS line 17 and the gate line 12 are each extended in the column direction of the pixel electrode 11 to overlap with spaces in the column direction between the pixel electrodes 11 adjacent in the row direction, i.e., spaces between adjacent two row pixel electrodes 11. As a result, light leakage in black display state can be prevented, and improved contrast display can be provided.

The active matrix substrate of Embodiment 3 is provided with the CS lines 17 and the gate lines 12 disposed in different layers with a first insulating film 22 therebetween, as shown in FIG. 7. Specifically, the active matrix substrate of Embodiment 3 includes, in a gate line 12-CS line 17 overlapping region, a glass substrate 21, the CS lines 17, the first insulating film 22, the gate lines 12, a second insulating film 23, the source lines 13, a third insulating film 24, and the pixel electrodes 11 in this order toward an LC layer. This configuration obviates the need of spacing the CS line 17 from the gate line 12 with a certain distance therebetween for preventing connection of the gate line 12 to the CS line 17. And as shown in FIG. 7, at least one of the CS line 17 and the gate line 12 can be disposed to overlap with each space between the pixel electrodes 11.

According to Embodiment 3, the source line 13 is basically spaced from the CS line 17 and the gate line 12 so as not to overlap therewith as viewed in the display face. Specifically, the source line 13 and the CS line 17 overlap with each other substantially only at the intersection thereof, and the source line 13 and the gate line 12 also only at the intersection thereof. Thus, signal delay caused by a parasitic capacitance formed between the lines can be prevented, leading to stable display qualities.

According to Embodiment 3, the extending portion 19 of the CS line 17 and the extending portion 29 of the gate line 12 are basically overlapped with each other in order to reduce a parasitic capacitance formed therebetween. However, only distal ends of the respective extending portions are overlapped with each other to provide sufficient light-shielding effects. Accordingly, the extending portion 19 of the CS line 17 overlaps with the extending portion 29 of the gate line 12 substantially only at their distal ends. Thus signal delay can be prevented, and display qualities can be stabilized.

Embodiment 4

FIG. 8 is a plan view schematically showing a pixel configuration of an LCD device of Embodiment 4. The LCD device of Embodiment 4 is the same as in Embodiment 1, except that source lines 13 each have a pattern symmetry in the column direction to overlap with adjacent pixel electrodes 11 in the row direction. More specifically, in Embodiment 4, each of the source lines 13 extends in the column direction of the pixel electrode 11, overlapping with a right one of adjacent two row pixel electrodes 11, and bends at a bend point 18 toward a left one to pass across a space between the two row pixel electrodes 11. Then the source line bends again at a bend point 18 to extend in the column direction, overlapping with the left pixel electrode 11. Further, the thus-extended source line 13 passes across the gate line 12 and extends toward a pair of pixel electrodes 11 in a next column. Then the source line 13 extends in the column direction of the pixel electrode 11, overlapping with the left pixel electrode 11, and bends at a bend point 18 toward the right pixel electrode 11 to pass across the space again. Then, the source line 13 bends again at a bend point 18 to extend in the column direction of the pixel electrode 11, overlapping with the right pixel electrode 11. According to this embodiment, the number of the crossing portions of the source line can be decreased, thereby shortening the total length of the source line. As a result, influences of signal delay can be minimized. The configuration of Embodiment 4 can be applied to any of the above-mentioned or below-mentioned Embodiments.

Embodiment 5

FIG. 9 is a plan view schematically showing a pixel configuration of an LCD device of Embodiment 5. As shown in FIG. 9, according to the LCD device of Embodiment 5, CS lines 17, gate lines 12, and source lines 13 are disposed in different layers. The extension of the CS line 17 decreases the distance between the CS line 17 and the gate line 12. If leakage between these two lines 17 and 12 unexpectedly occurs, the two lines 17 and 12 can not exhibit the respective functions. So in the LCD device of Embodiment 5, the CS line 17, the gate line 12, and the source line 13 are disposed in different layers with an insulating film therebetween in order to minimize a possibility of leakage defects.

Embodiment 6

FIG. 10 is a plan view schematically showing a pixel configuration of an LCD of Embodiment 6. As shown in FIG. 10, the LCD device of Embodiment 6 is the same as in Embodiment 1, except that gate lines 12 are each disposed to pass across the center of a pixel electrode 11 and that CS lines 17 overlap with respective spaces between adjacent two of the pixel electrodes 11 in the column direction. An extending portion 19 of the CS line 17 is used as a member for light-shielding spaces between adjacent two of the pixel electrodes 11 in the row direction. In the configuration of Embodiment 6, the advantages equivalent to Embodiment 1 can be obtained in view of light-shielding between the pixel electrodes and suppression of signal delay. According to Embodiment 6, the CS line 17, which overlaps with the space between the adjacent two column pixel electrodes 11, is extended toward the center of the pixel electrode 11 to form a storage capacitance together with a drain-drawing line 15, which is connected to the pixel electrode 11 through the contact hole 16.

Embodiment 7

FIGS. 11-1 to 11-3 are plan views each schematically showing a pixel configuration of an LCD device of Embodiment 7. FIG. 11-1 shows an embodiment in which floating electrodes 39, CS lines 17, and gate lines 12 are disposed in a layer, and source lines 13 are disposed in another layer. FIG. 11-2 shows an embodiment in which floating electrodes 39 and source lines 13 are arranged in a layer, and gate lines 12 and CS lines 17 are disposed in another layer. FIG. 11-3 shows an embodiment in which CS lines 17 and gate lines 12 are disposed in the same layer, and floating electrodes 39; the CS lines 17 and the gate lines 12; and the source lines 13 are disposed in different layers.

As shown in FIGS. 11-1 to 11-3, the LCD device of Embodiment 7 is the same as in Embodiment 1, except that the floating electrodes 39, which has no connection to the CS lines 17 nor the gate lines 12, are each disposed to overlap with a space between adjacent two row pixel electrodes 11 and that the CS lines 17 has no extending portion. According to Embodiment 7, each space between the adjacent two row pixel electrodes 11 can be light-shielded without extending respective parts of the CS line 17 and the gate line 12. The floating electrode 39 does not overlap with the source line 13, and so formation of a parasitic capacitance therebetween can be suppressed, leading to improved reliability. According to the embodiment shown in FIG. 11-1, the floating electrodes 39, the CS lines 17, and the gate lines 12 are disposed in the same layer, and so these members can be formed at a time using the same material, which can simplify the production steps. Further, the source line 13 is disposed in a layer different from the layer where the floating electrodes 39, the CS lines 17, and the gate lines 12 are positioned, and so a possibility of generation of unexpected leakage defects can be lowered. According to the embodiment shown in FIG. 11-2, the floating electrodes 39 and the source lines 13 are disposed in the same layer, and so these members can be formed at a time using the same material, which can simplify the production steps. Further, the gate lines 12 and the CS lines 17 are disposed in the same layer, and so these members can be formed at a time using the same material, which can simplify the production steps. In addition, the floating electrodes 39 and the source lines 13 are disposed in a layer different from the layer where the CS lines 17 and the gate lines 12 are positioned, with an insulating layer therebetween. As a result, unexpected leakage defects can be suppressed. According to the embodiment shown in FIG. 11-3, the CS lines 17 and the gate lines 12 are disposed in the same layer, and so these members can be formed at a time using the same material, which can simplify the production steps. Further, the floating electrodes 39; the CS line 17 and the gate line 12; and the source line 13 are disposed in different layers. As a result, a possibility of generation of unexpected leakage defects can be more effectively lowered.

Embodiment 8

FIG. 12 is a plan view schematically showing a pixel configuration of an LCD device of Embodiment 8. As shown in FIG. 12, the LCD device of Embodiment 8 is the same as in Embodiment 1 except for the following three points: CS lines 17 and gate lines 12 each extend in the column direction and also overlap with spaces between adjacent two row pixel electrodes 11; floating electrodes 39 are also disposed to overlap with the spaces between the adjacent two row pixel electrodes 11; and the CS lines 17 and the gate lines 12 are disposed in a layer, the source lines 13 and the floating electrodes 39 are disposed in another layer. According to Embodiment 8, each of the gate lines 12 is disposed to the space between the adjacent two row pixel electrodes 11, and so similarly to Embodiment 3, every space in both of the column and row directions between the adjacent pixel electrodes 11 can be light-shielded. Thus, the LCD device in this Embodiment can provide high-contrast display.

Embodiment 9

FIG. 13 is a plan view schematically showing a pixel configuration of an LCD device of Embodiment 9. As shown in FIG. 13, the LCD device of Embodiment 9 is the same as in Embodiment 1, except for the following two points: source lines 13 each have bend points 18 not at the center of a pixel electrode 11 but at a position closer to a gate line 12; and a crossing portion 20 passing across a space between adjacent two row pixel electrodes 11 is positioned also closer to the gate line 12. Also in Embodiment 9, the source line 13 overlaps with the CS line 17 substantially only at their intersection, and so advantages equivalent to that in Embodiment 1 can be obtained in view of suppression of parasitic capacitance formed between the source line 13 and the CS line 17.

Embodiment 10

FIG. 14 is a plan view schematically showing a pixel configuration of an LCD device of Embodiment 10. As shown in FIG. 14, the LCD device of Embodiment 10 is the same as in Embodiment 1 except for the following four points: source lines 13 each have no overlaps with an extending portion 19 of a CS line 17, an extending portion 29 of a gate line 12 and a floating electrode 39; each of the source lines 13 has bending points not at the center of a pixel electrode but at a position closer to the gate line 12 and so has a crossing portion, which passes across a space between adjacent two row pixel electrodes 11, closer to the gate line 12; not the gate line 12 but the CS line 17 is disposed to overlap with a space between adjacent two column pixel electrodes 11; and each of the CS line 17 and the gate line 12 has an extending portion. Also in Embodiment 10, the source line 13 overlaps with the CS line 17 substantially only at their intersection and also overlaps with the gate line 12 substantially only at their intersection. So the same advantages as in Embodiment 1 can be obtained in view of suppression of parasitic capacitances formed between the source line 13 and the CS line 17 and between the source line 13 and the gate line 12.

The present application claims priority to Patent Application No. 2008-040101 filed in Japan on Feb. 21, 2008 under the Paris Convention and provisions of national law in a designated State, the entire contents of which are hereby incorporated by reference.

BRIEF DESCRIPTION OF DRAWINGS

FIG. 11-1 is a plan view schematically showing a pixel configuration of an LCD device of Embodiment 7, and showing an embodiment where a floating electrode, a CS line, and a gate line are disposed in a layer and a source line is disposed in another layer.

FIG. 11-2 is a plan view schematically showing a pixel configuration of an LCD device of Embodiment 7, and showing an embodiment where a floating electrode and a source line are disposed in a layer, and a gate line and a CS line are disposed in another layer.

FIG. 11-3 is a plan view schematically showing a pixel configuration of an LCD device of Embodiment 7, and a CS line and a gate line are disposed in the same layer, and a floating electrode; the CS line and the gate line; and a source line are disposed in different layers.

FIG. 15(a) shows the relationship without misalignment. FIG. 15(b) shows the relationship with misalignment.

FIG. 16(a) shows the relationship without misalignment. FIG. 16(b) shows the relationship with misalignment.

EXPLANATION OF NUMERALS AND SYMBOLS

Figure 1:
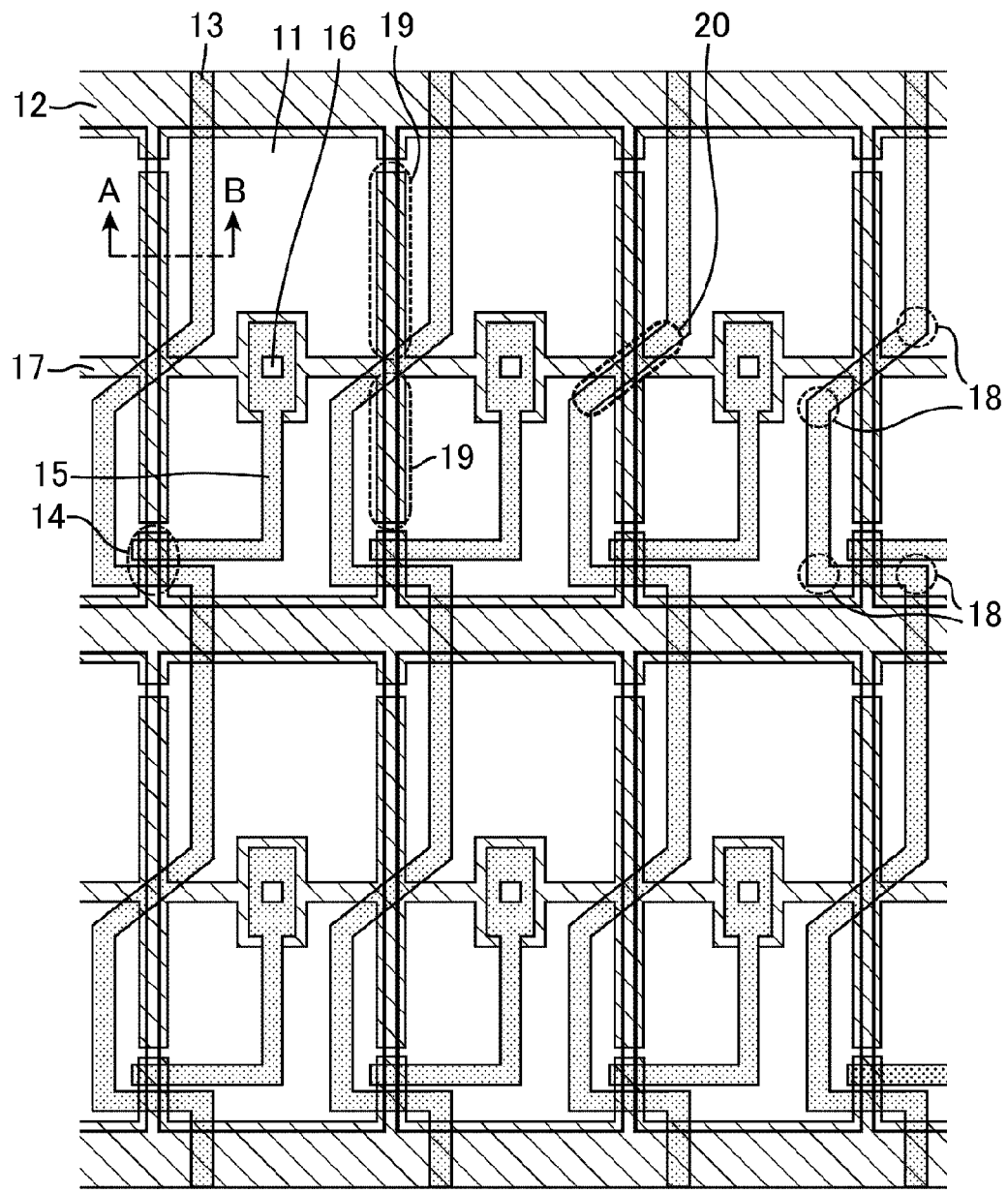
FIG. 1 is a plan view schematically showing a pixel configuration of an LCD device of Embodiment 1.
Figure 2:
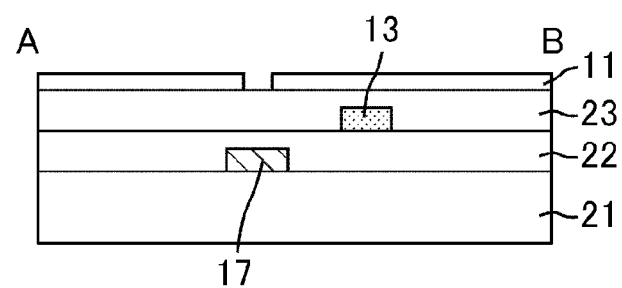
FIG. 2 is a schematic cross-sectional view taken along line A-B of FIG. 1.
Figure 3:
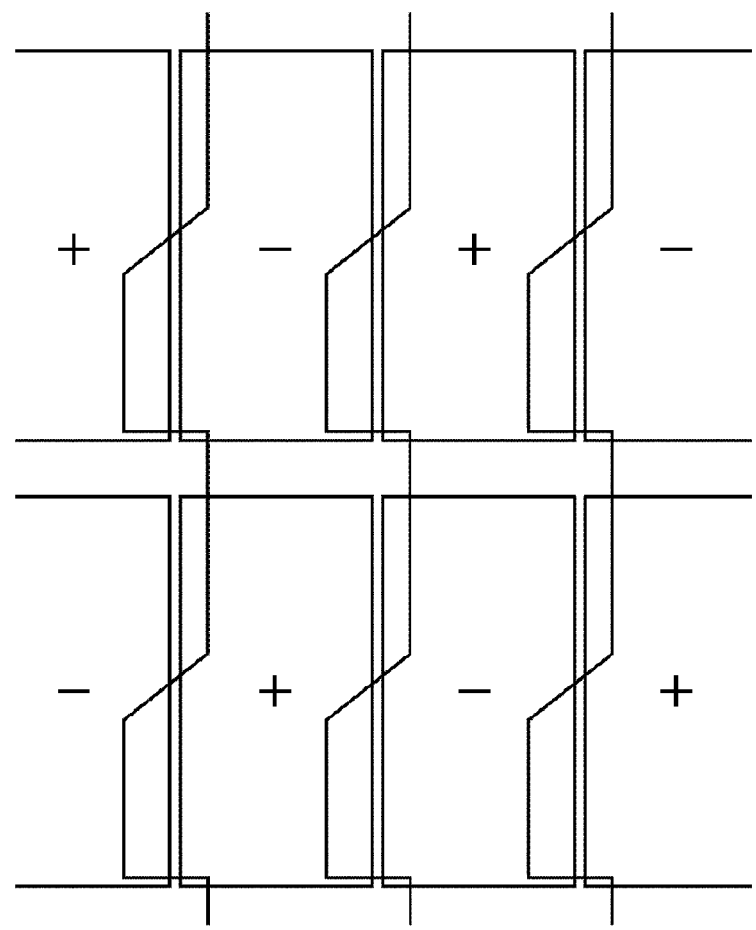
FIG. 3 is a plan view schematically showing polarities of pixel electrodes of the LCD device of Embodiment 1.
Figure 4:
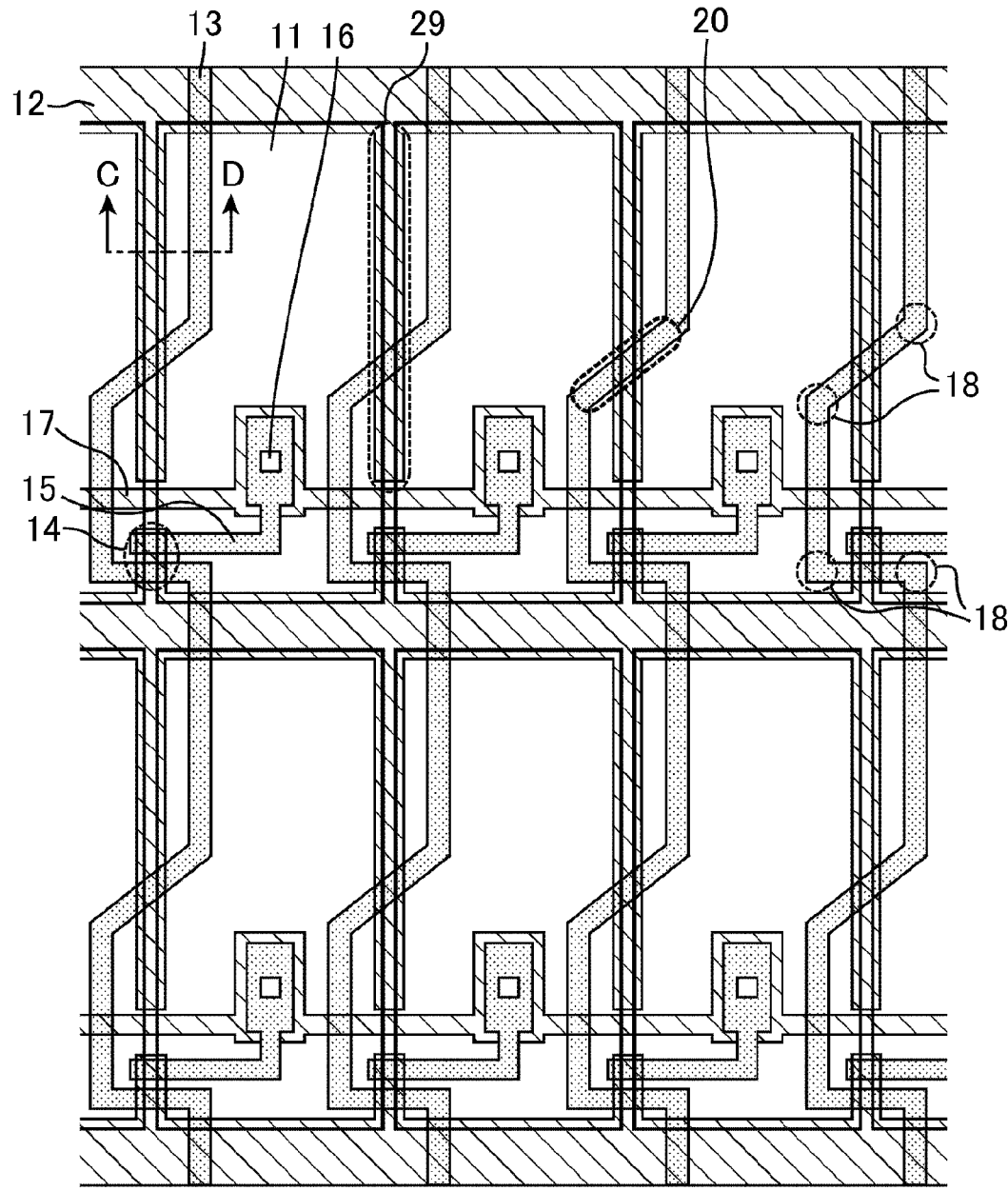
FIG. 4 is a plan view schematically showing a pixel configuration of an LCD device of Embodiment 2.
Figure 5:
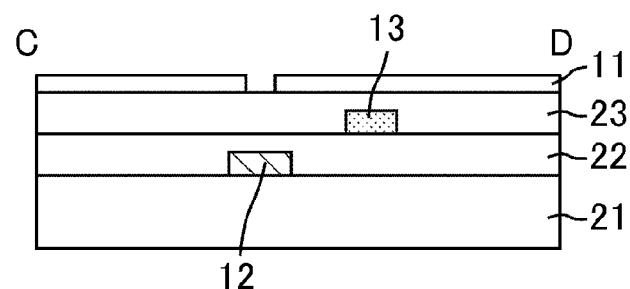
FIG. 5 is a schematic cross-sectional view taken along line C-D of FIG. 2.
Figure 6:
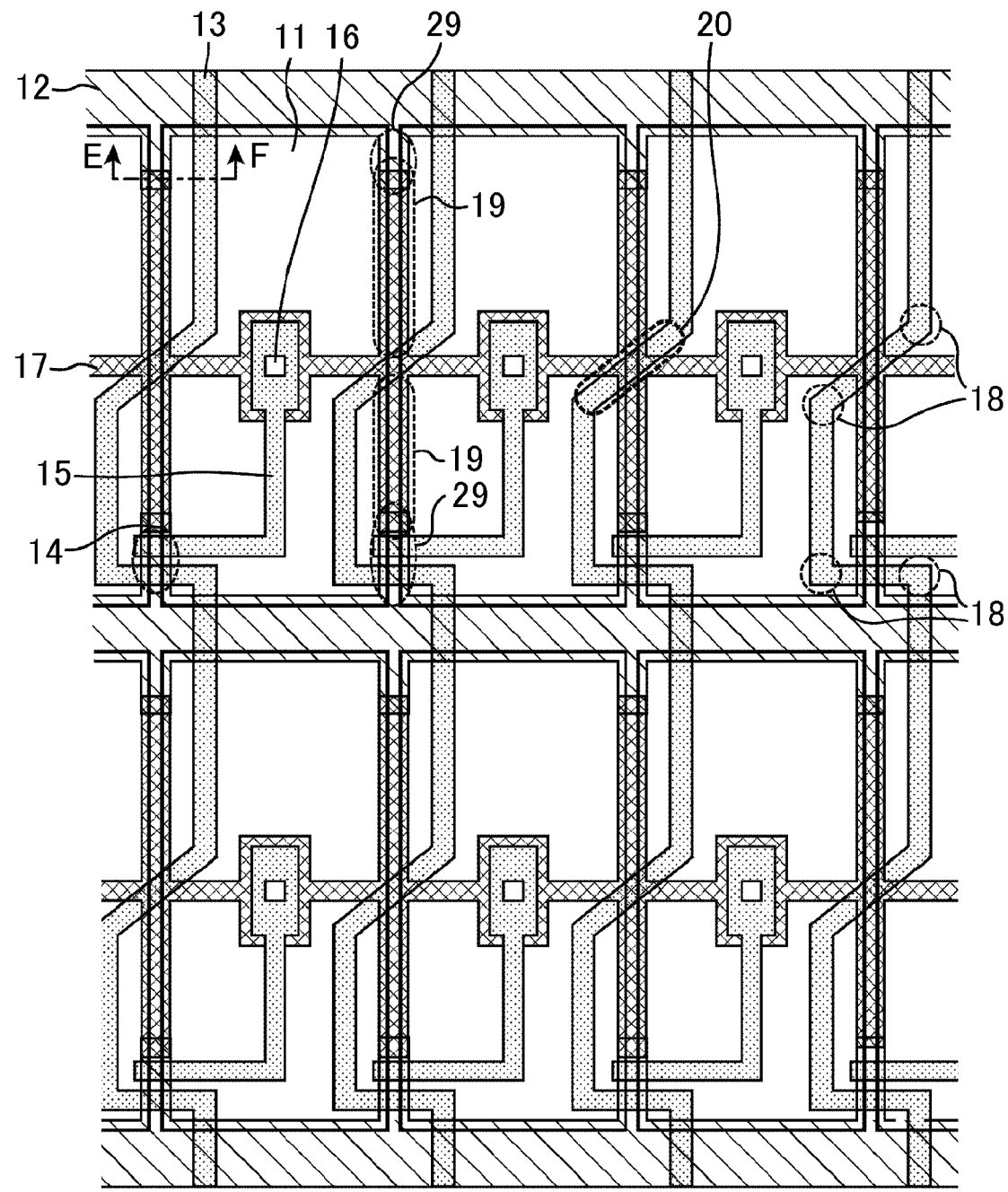
FIG. 6 is a plan view schematically showing a pixel configuration of an LCD device of Embodiment 3.
Figure 7:
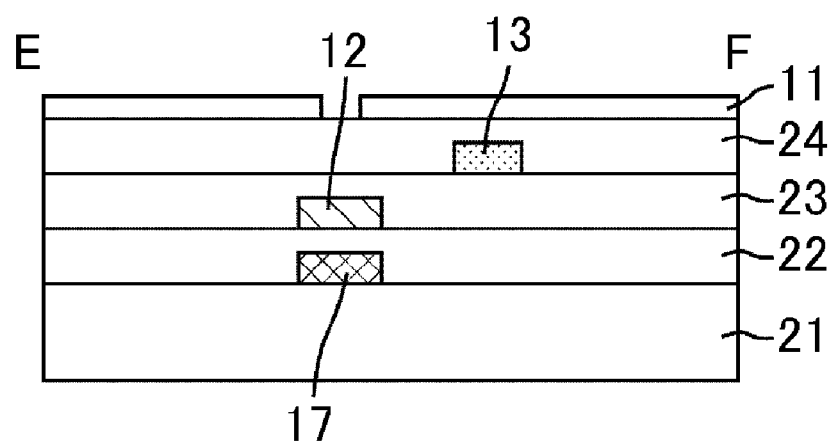
FIG. 7 is a schematic cross-sectional view taken along line E-F of FIG. 6.
Figure 8:
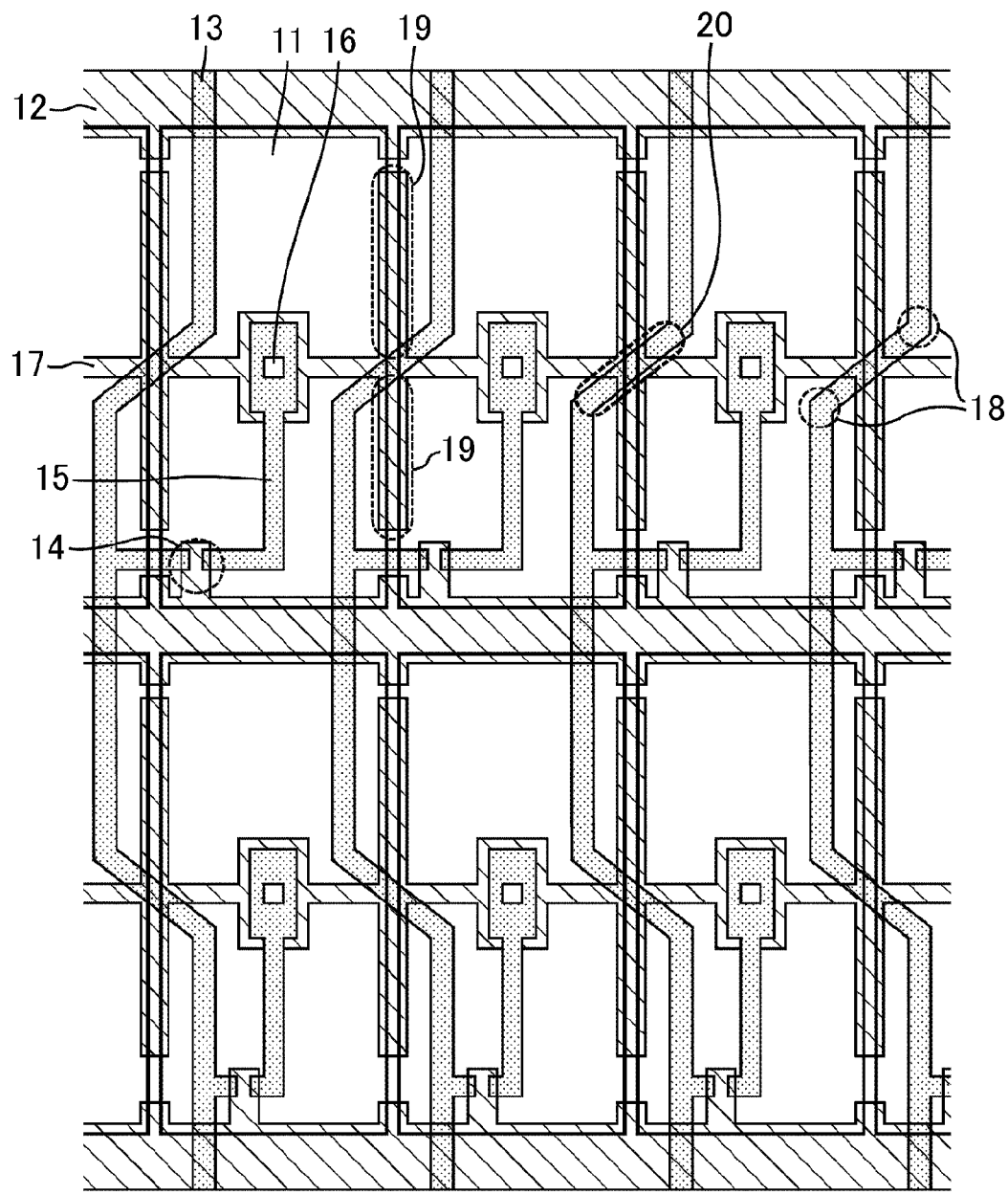
FIG. 8 is a plan view schematically showing a pixel configuration of an LCD device of Embodiment 4.
Figure 9:
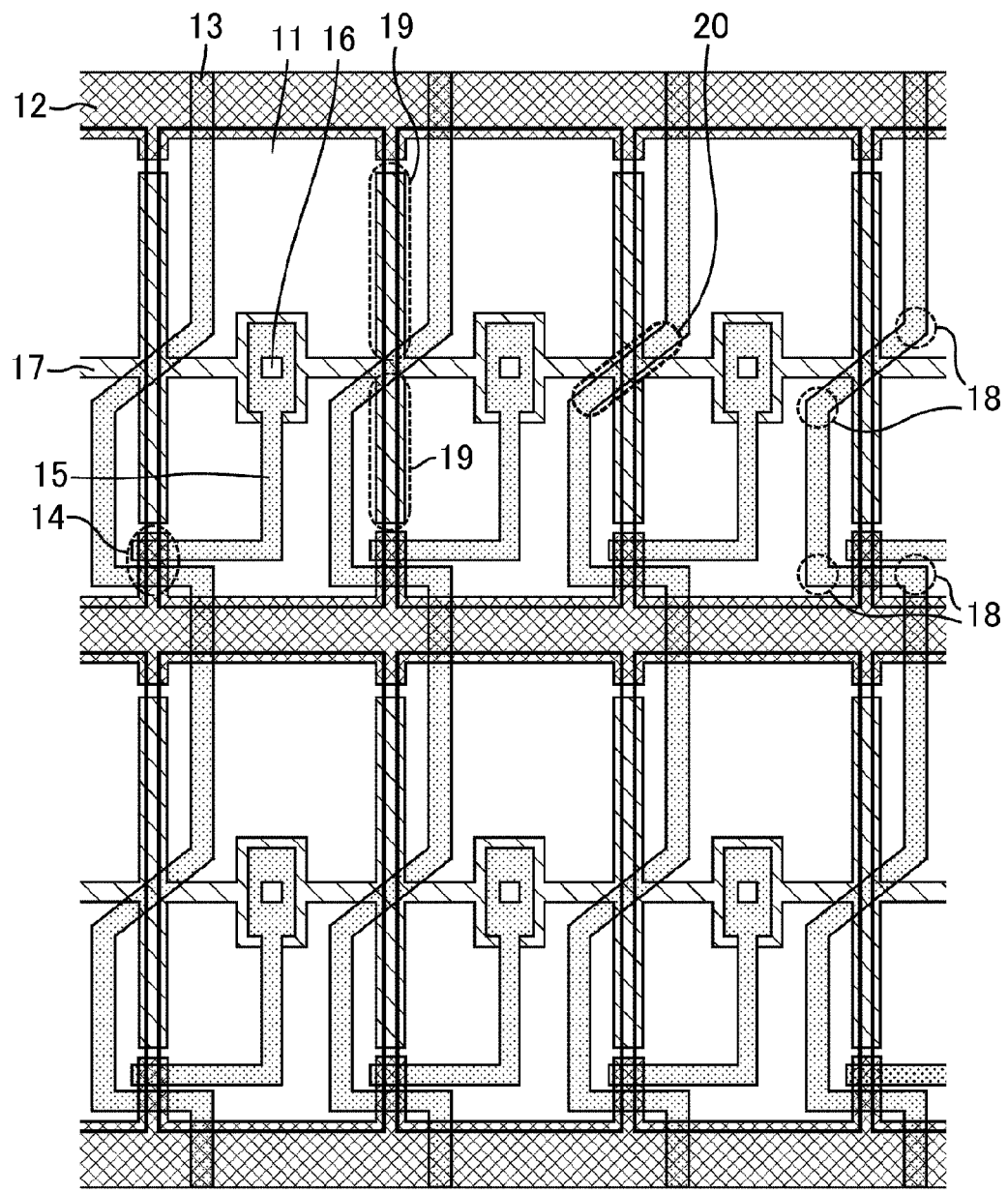
FIG. 9 is a plan view schematically showing a pixel configuration of an LCD device of Embodiment 5.
Figure 10:
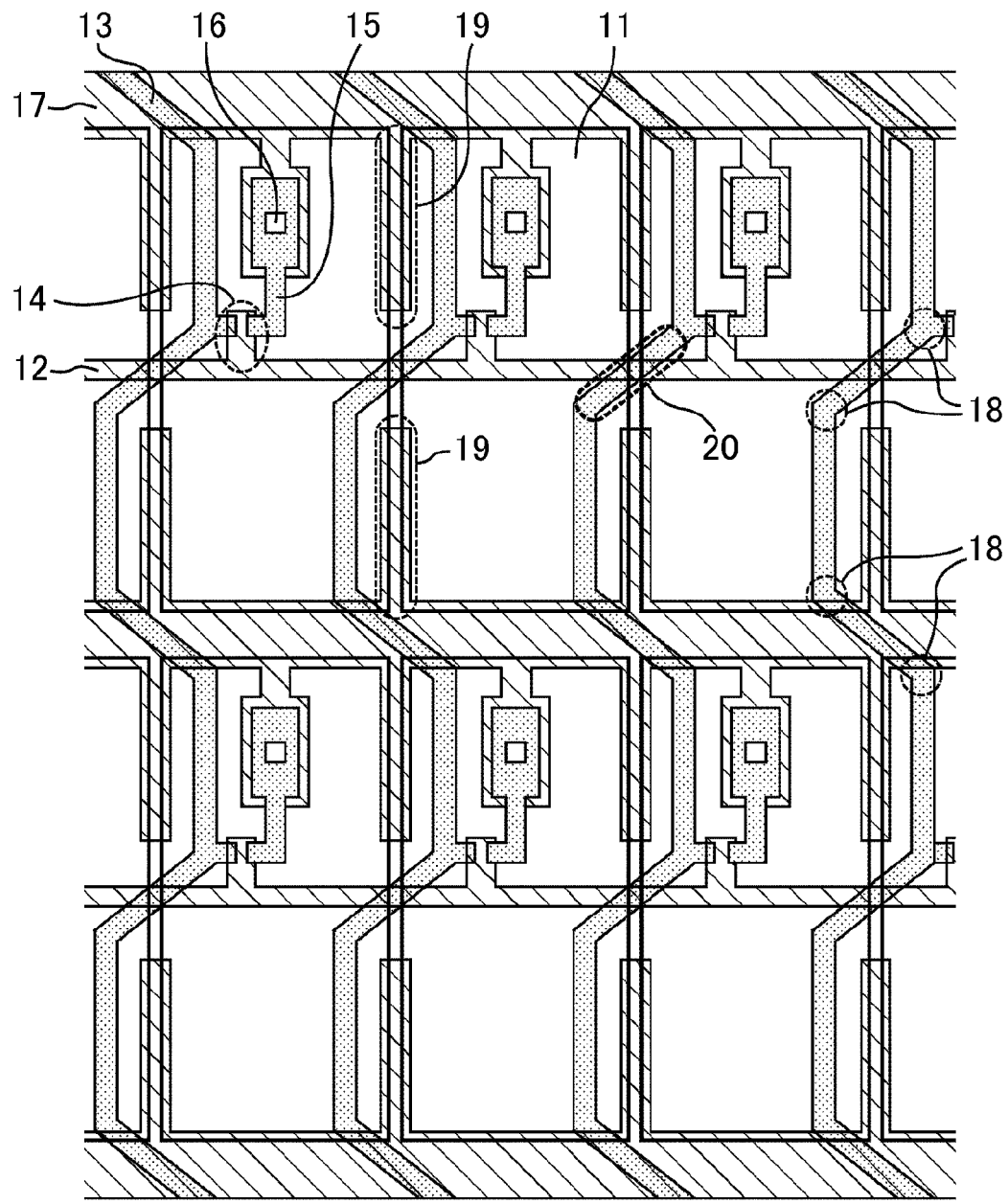
FIG. 10 is a plan view schematically showing a pixel configuration of an LCD device of Embodiment 6.
Figures 1, 11:
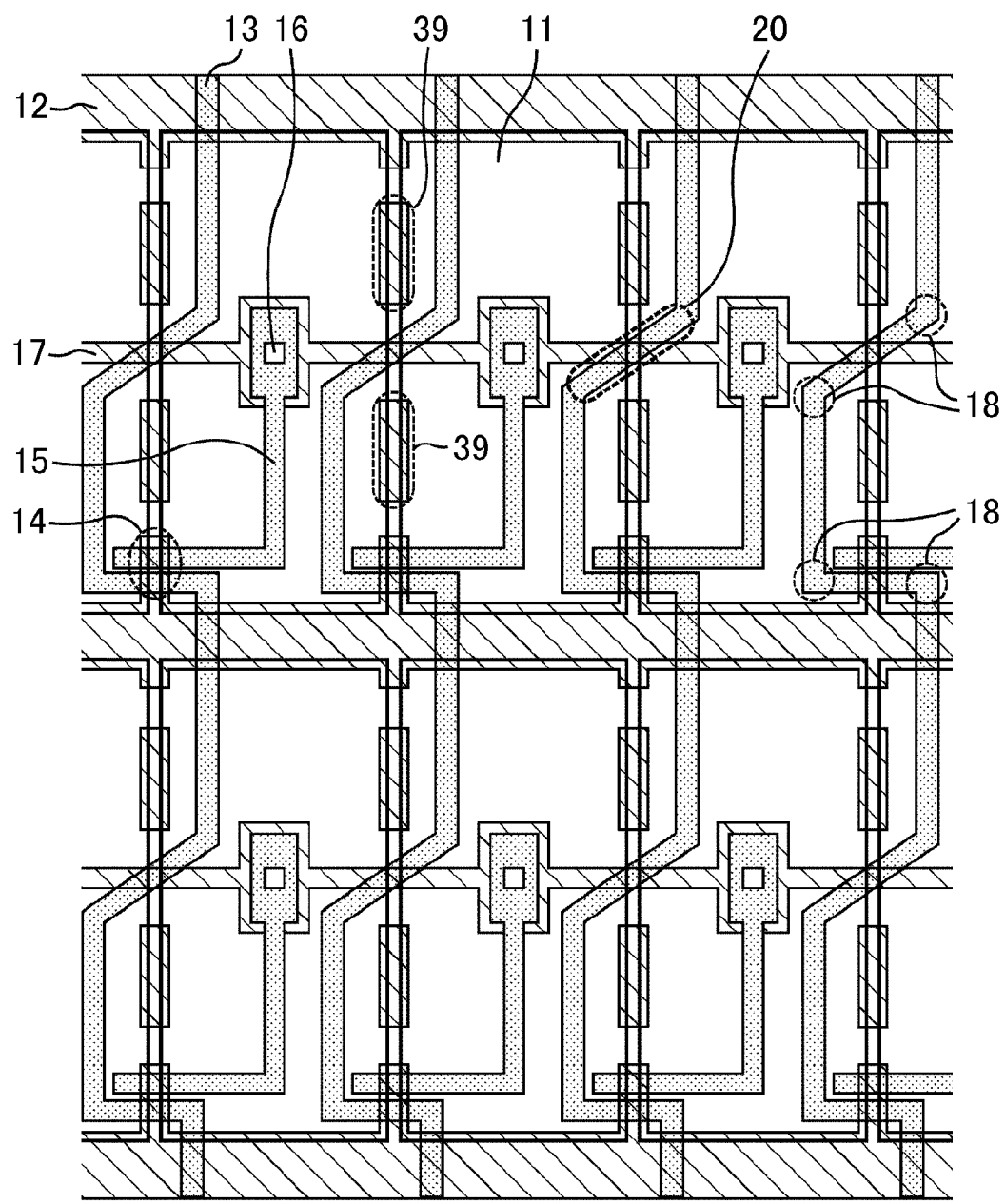
Figures 2, 11:
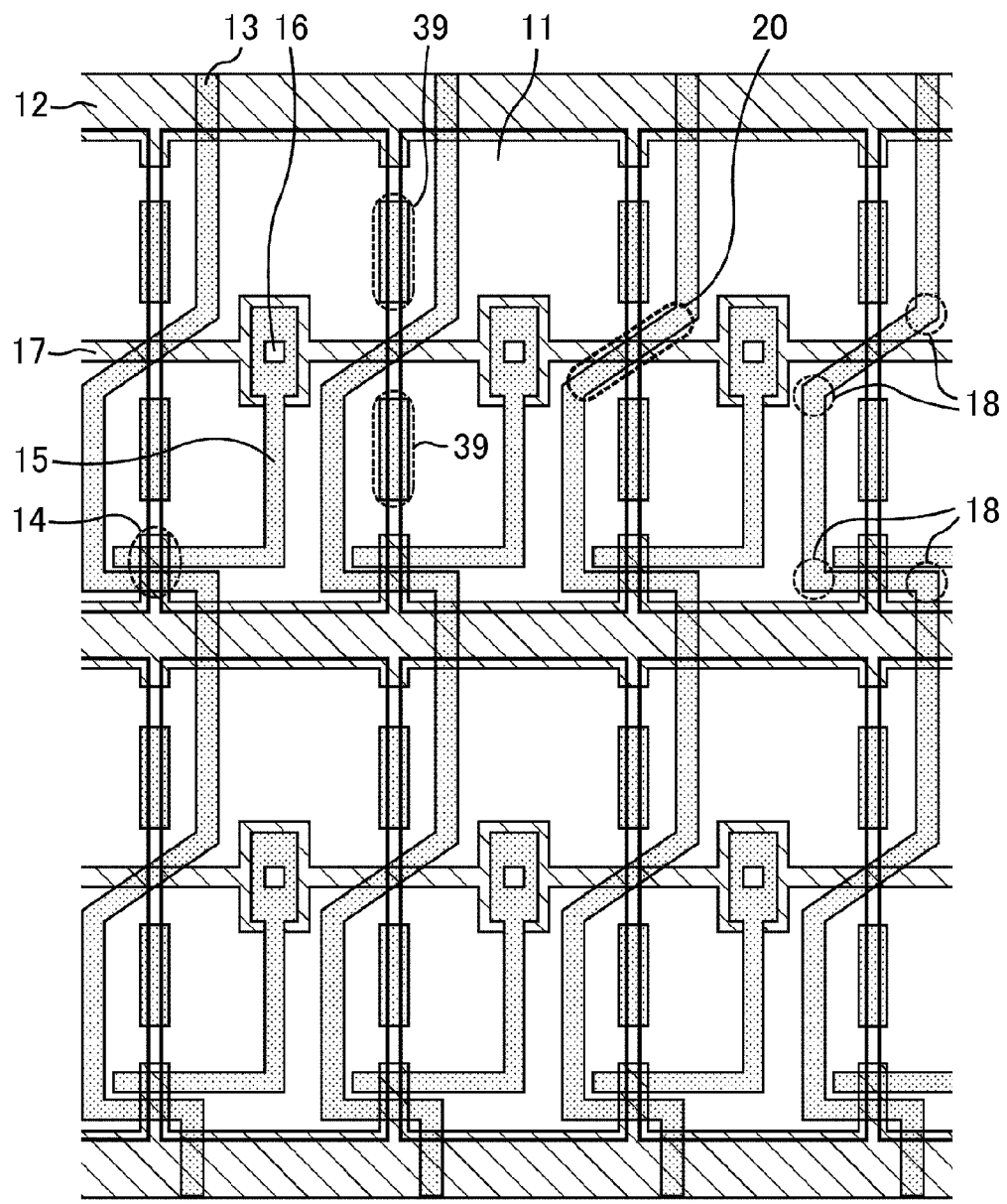
Figures 3, 11:
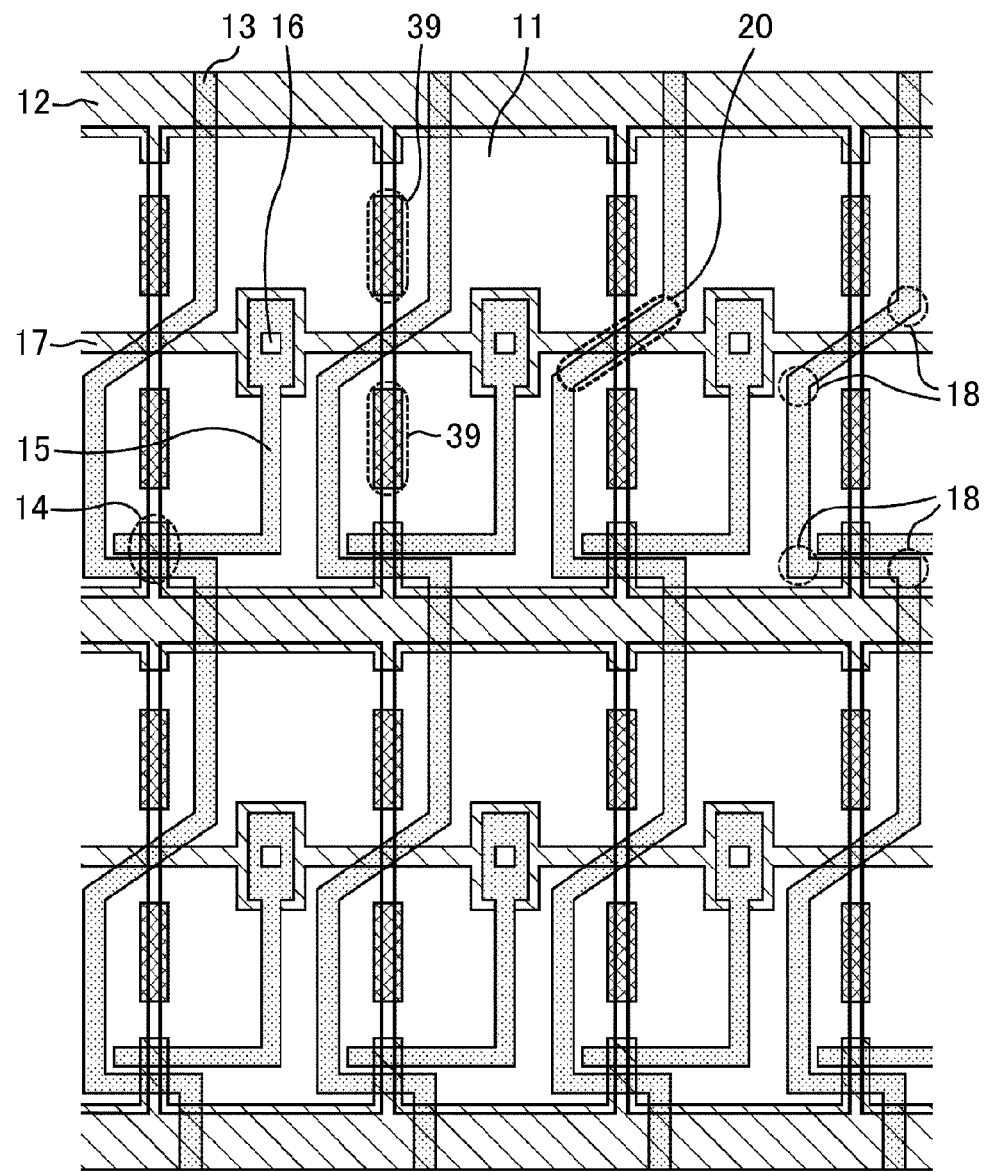
Figure 12:
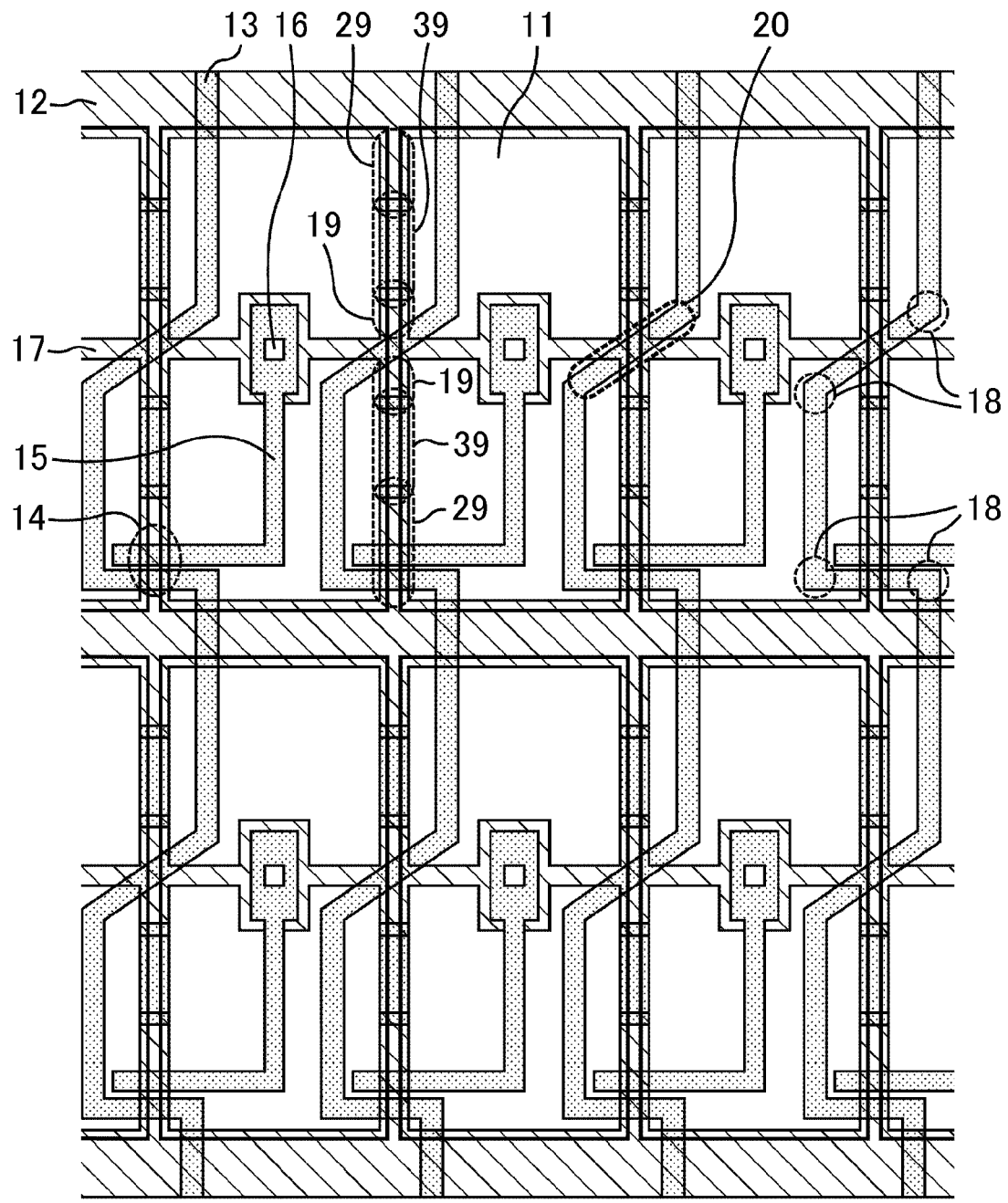
FIG. 12 is a plan view schematically showing a pixel configuration of an LCD device of Embodiment 8.
Figure 13:
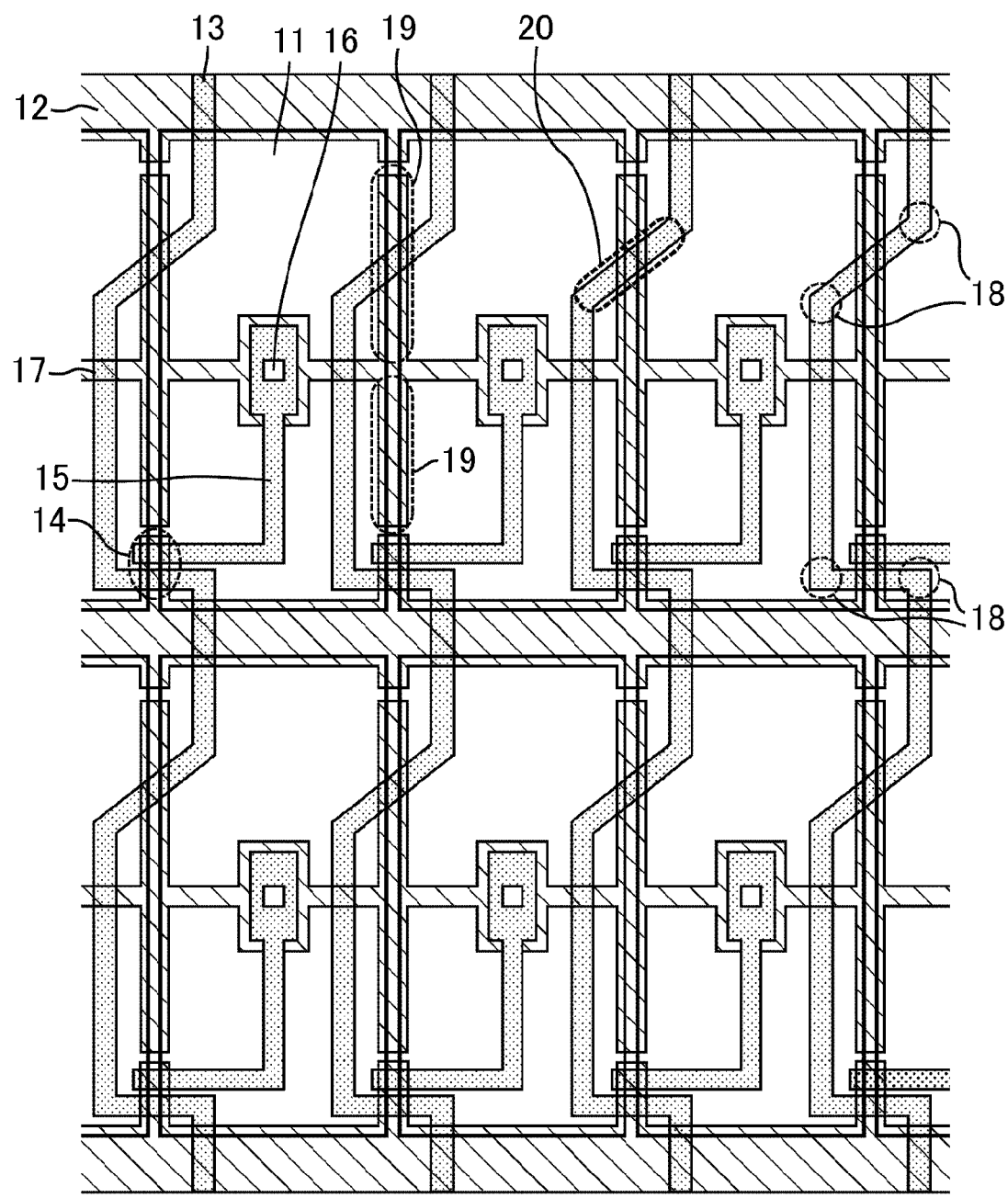
FIG. 13 is a plan view schematically showing a pixel configuration of an LCD device of Embodiment 9.
Figure 14:
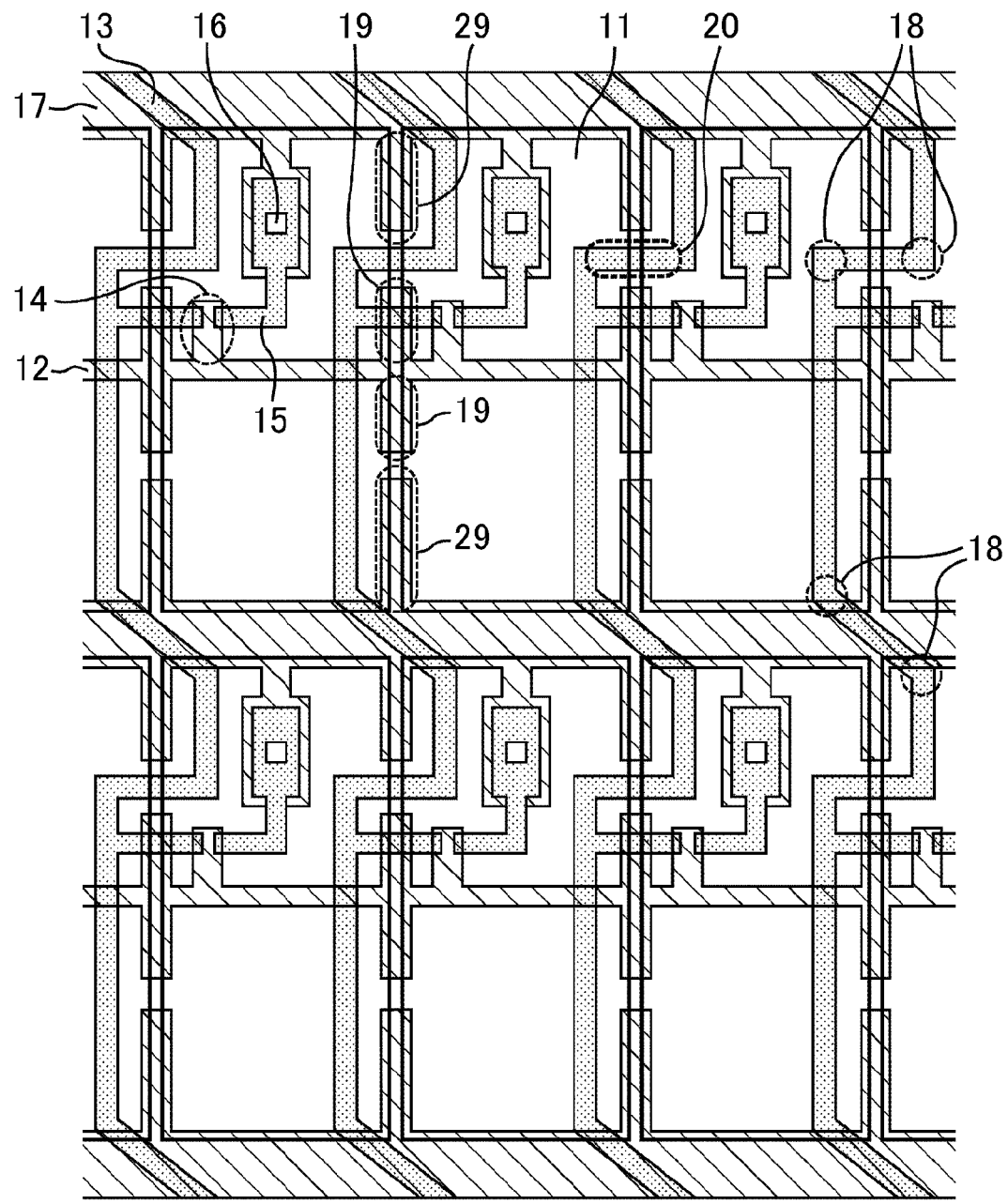
FIG. 14 is a plan view schematically showing a pixel configuration of an LCD device of Embodiment 10.
Figure 15:
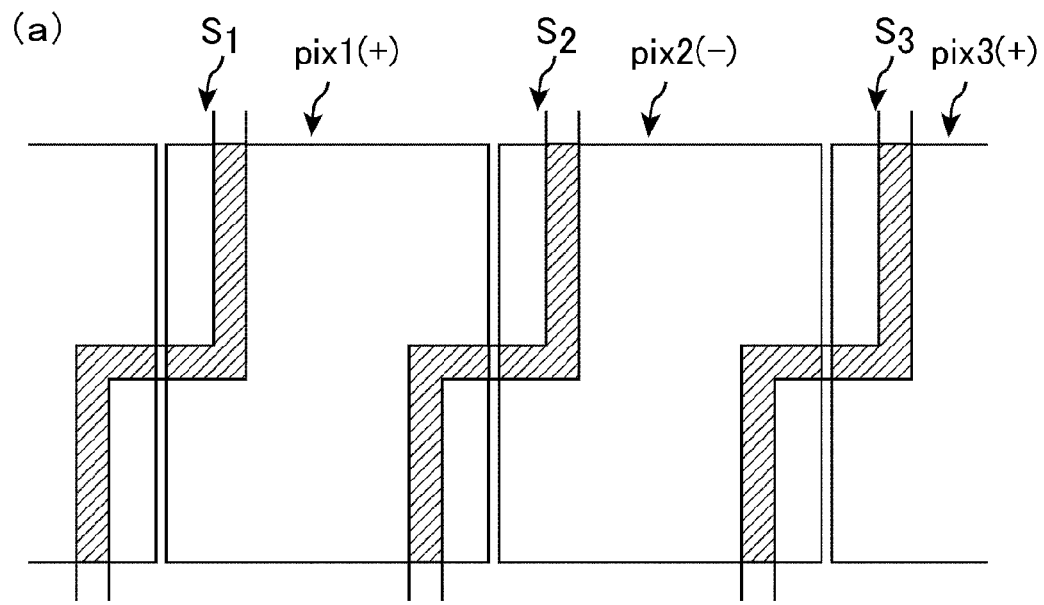
FIG. 15 is a plan view schematically showing a relationship between locations of pixel electrodes and source lines, and a capacitance formed therebetween, and showing an embodiment of the present invention where the source line has bend points.
Figure 15:
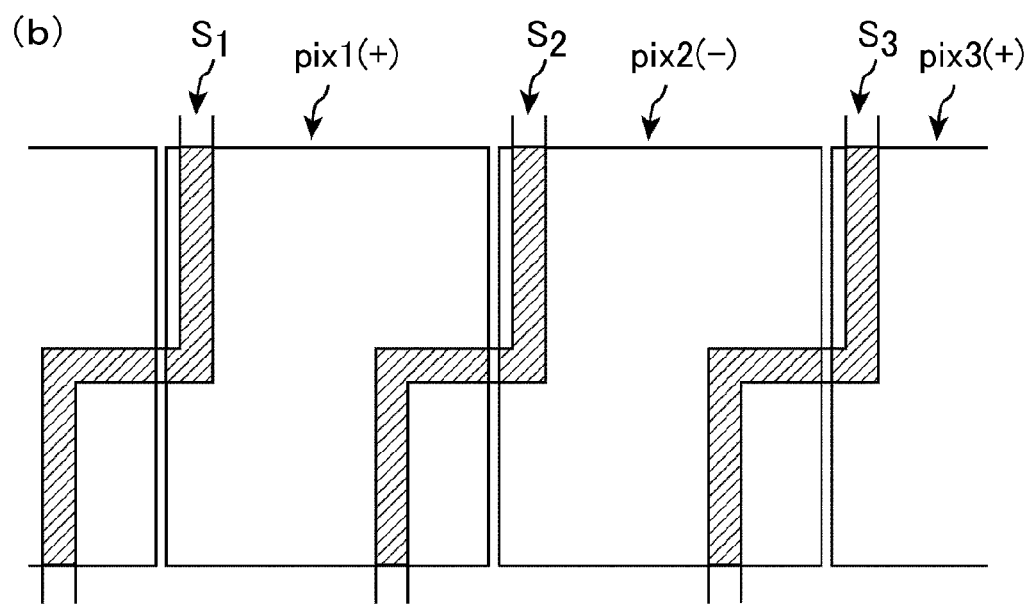
Figure 16:
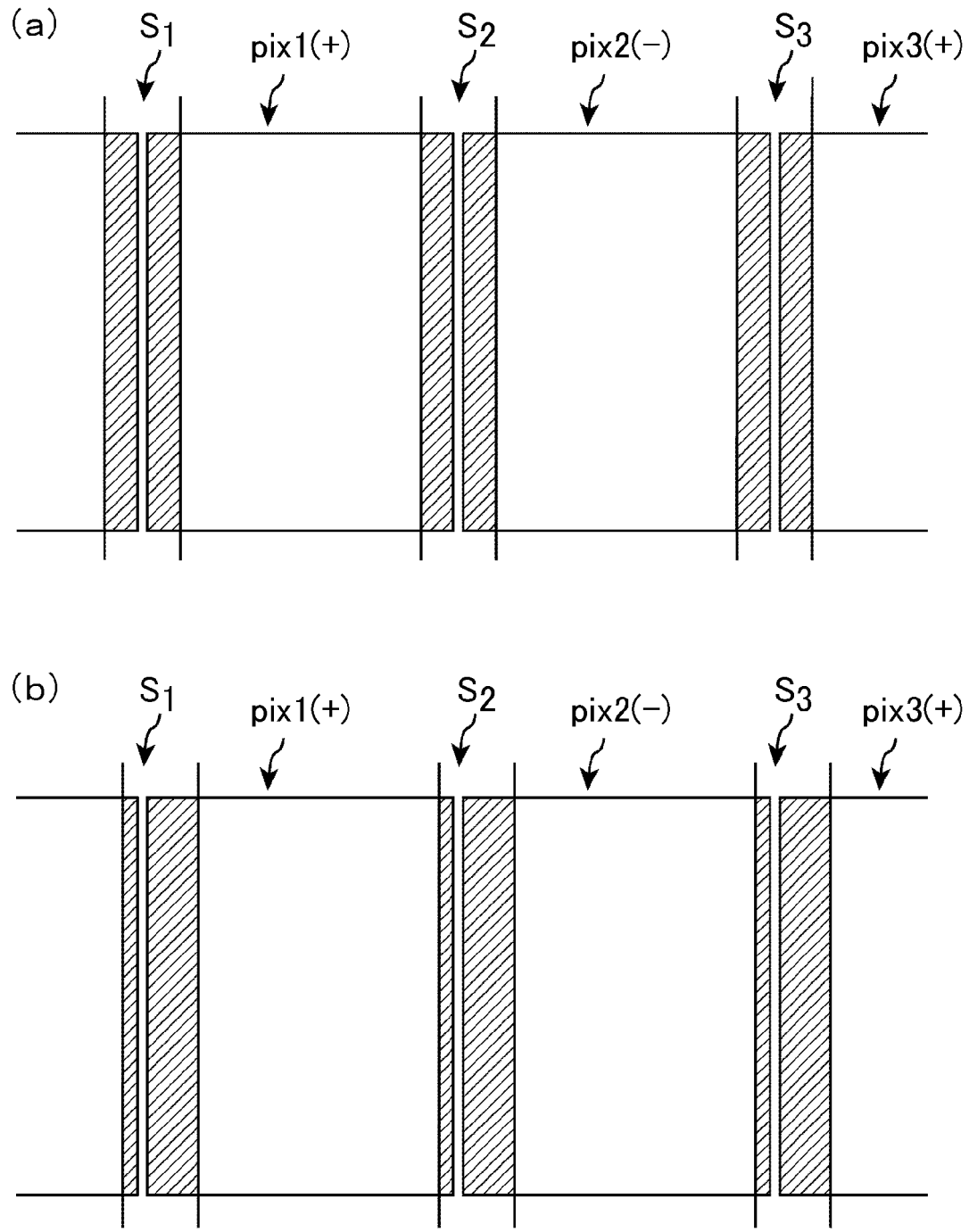
FIG. 16 is a plan view schematically showing a relationship between locations of pixel electrodes and source lines, and a capacitance formed therebetween, and showing a conventional embodiment where the source line has no bend points.

11: Pixel electrode
12: Gate line
13: Source line
14: TFT
15: Drain-drawing line
16: Contact hole
17: CS line
18: Bend point
19: Extending portion of CS line
20: Crossing portion
21: Glass substrate
22: First insulating film
23: Second insulating film
24: Third insulating film
29: Extending portion of gate line
39: Floating electrode
S1 to S3: Source line
pix1 to pix3: Pixel electrode

The invention claimed is:

1. An active matrix substrate, comprising:
pixel electrodes arranged in a matrix pattern;
a source line extending in a column direction and overlapping with any adjacent two of the pixel electrodes in a row direction; and
a storage capacitor line extending in the row direction and intersecting with the source line,
wherein the pixel electrodes, the source line, and the storage capacitor line are disposed in different layers stacked with an insulating film therebetween,
the source line has bend points below both of the adjacent two row pixel electrodes and has a crossing portion passing across a space between the adjacent two row pixel electrodes,
the storage capacitor line has a portion extending in the column direction and overlapping with the space between the adjacent two row pixel electrodes, and
the source line overlaps with the storage capacitor line substantially only at an intersection thereof.

2. The active matrix substrate according to claim 1, wherein the adjacent two row pixel electrodes are different in polarity.

3. The active matrix substrate according to claim 1, further comprising a gate line extending in the row direction and intersecting with the source line,
wherein the gate line has a portion extending in the column direction and overlapping with the space between the adjacent two row pixel electrodes.

4. The active matrix substrate according to claim 3, wherein the gate line is disposed to overlap with a space between any adjacent two of the pixel electrodes in the column direction.

5. The active matrix substrate according to claim 1, further comprising a gate line extending in the row direction and intersecting with the source line, wherein the gate line and the storage capacitor line are disposed in the same layer.

6. The active matrix substrate according to claim 1, further comprising a gate line extending in the row direction and intersecting with the source line, wherein the gate line and the storage capacitor line are disposed in different layers with an insulating film therebetween.

7. The active matrix substrate according to claim 6, wherein the space between the adjacent two row pixel electrodes overlaps with at least one of the gate line and the storage capacitor line.

8. The active matrix substrate according to claim 1, wherein the storage capacitor line is disposed to overlap with a space between any adjacent two of the pixel electrodes in the column direction.

9. The active matrix substrate according to claim 1, further comprising a floating electrode overlapping with the space between the adjacent two row pixel electrodes.

10. The active matrix substrate according to claim 9, wherein the floating electrode overlaps with the storage capacitor line substantially only at an intersection thereof.

11. The active matrix substrate according to claim 9, wherein the floating electrode does not substantially overlap with the storage capacitor line.

12. The active matrix substrate according to claim 9, wherein the floating electrode and the storage capacitor line are disposed in the same layer.

13. The active matrix substrate according to claim 9, wherein the floating electrode and the storage capacitor line are disposed in different layers with an insulating film therebetween.

14. The active matrix substrate according to claim 13, wherein the space between the adjacent two row pixel electrodes overlaps with at least one selected from the floating electrode, the storage capacitor line, and the gate line.

15. A liquid crystal display device, comprising:
the active matrix substrate according to claim 1;
a liquid crystal layer; and
a counter substrate, stacked in this order,
wherein the counter substrate includes a black matrix overlapping with a space between any adjacent two of the pixel electrodes.

16. An active matrix substrate, comprising:
pixel electrodes arranged in a matrix pattern;
a source line extending in a column direction and overlapping with any adjacent two of the pixel electrodes in a row direction; and
a gate line extending in the row direction and intersecting with the source line,
wherein the pixel electrodes, the source line, and the gate line are disposed in different layers stacked with an insulating film therebetween,
the source line has bend points below both of the adjacent two row pixel electrodes and has a crossing portion passing across a space between the adjacent two row pixel electrodes,
the gate line has a portion extending in the column direction and overlapping with the space between the adjacent two row pixel electrodes, and
the source line overlaps with the gate line substantially only at an intersection thereof.

17. The active matrix substrate according to claim 16, wherein the adjacent two row pixel electrodes are different in polarity.

18. The active matrix substrate according to claim 16, further comprising a storage capacitor line extending in the row direction and intersecting with the source line,
wherein the storage capacitor line has a portion extending in the column direction and overlapping with the space between the adjacent two row pixel electrodes.

19. The active matrix substrate according to claim 18, wherein the storage capacitor line is disposed to overlap with a space between any adjacent two of the pixel electrodes in the column direction.

20. The active matrix substrate according to claim 16, further comprising a storage capacitor line extending in the row direction and intersecting with the source line,
wherein the storage capacitor line and the gate line are disposed in the same layer.

21. The active matrix substrate according to claim 16, further comprising a storage capacitor line extending in the row direction and intersecting with the source line,
wherein the storage capacitor line and the gate line are disposed in different layers with an insulating film therebetween.

22. The active matrix substrate according to claim 21, wherein the space between the adjacent two row pixel electrodes overlaps with at least one of the storage capacitor line and the gate line.

23. The active matrix substrate according to claim 16, wherein the gate line is disposed to overlap with a space between any adjacent two of the pixel electrodes in the column direction.

24. The active matrix substrate according to claim 16, further comprising a floating electrode overlapping with the space between the adjacent two row pixel electrodes.

25. The active matrix substrate according to claim 24, wherein the floating electrode overlaps with the storage capacitor line substantially only at an intersection thereof.

26. The active matrix substrate according to claim 24, wherein the floating electrode does not substantially overlap with the storage capacitor line.

27. The active matrix substrate according to claim 24, wherein the floating electrode and the gate line are disposed in the same layer.

28. The active matrix substrate according to claim 24, wherein the floating electrode and the gate line are disposed in different layers with an insulating film therebetween.

29. The active matrix substrate according to claim 28, wherein the space between the adjacent two row pixel electrodes overlaps with at least one selected from the floating electrode, the gate line, and the storage capacitor line.

30. A liquid crystal display device, comprising:
the active matrix substrate according to claim 16;
a liquid crystal layer; and
a counter substrate, stacked in this order,
wherein the counter substrate includes a black matrix overlapping with a space between any adjacent two of the pixel electrodes.

31. An active matrix substrate, comprising:
pixel electrodes arranged in a matrix pattern; and
a source line extending in a column direction and overlapping any adjacent two of the pixel electrodes in a row direction,
wherein the pixel electrodes and the source line are disposed in different layers with an insulating film therebetween, the source line has bend points below both of the adjacent two row pixel electrodes and has a crossing portion passing across a space between the adjacent two row pixel electrodes, and the active matrix substrate includes a floating electrode extending in the column direction and overlapping with the space between the adjacent two row pixel electrodes.

32. The active matrix substrate according to claim 31, further comprising a storage capacitor line extending in the row direction and intersecting with the source line, wherein the floating electrode overlaps with the storage capacitor line substantially only at an intersection thereof.

33. The active matrix substrate according to claim 31, further comprising a storage capacitor line extending in the row direction and intersecting with the source line, wherein the floating electrode does not substantially overlap with the storage capacitor line.

34. The active matrix substrate according to claim 31, wherein the adjacent two row pixel electrodes are different in polarity.

35. The active matrix substrate according to claim 31, further comprising a storage capacitor line extending in the row direction and intersecting with the source line, wherein the storage capacitor line has a portion extending in the column direction and overlapping with the space between the adjacent two row pixel electrodes.

36. The active matrix substrate according to claim 31, further comprising a storage capacitor line extending in the row direction and intersecting with the source line, wherein the storage capacitor line and the floating electrode are disposed in the same layer.

37. The active matrix substrate according to claim 31, further comprising a storage capacitor line extending in the row direction and intersecting with the source line, wherein the storage capacitor line and the floating electrode are disposed in different layers with an insulating film therebetween.

38. The active matrix substrate according to claim 37, wherein the space between the adjacent two row pixel electrodes overlaps with at least one of the storage capacitor line and the floating electrode.

39. The active matrix substrate according to claim 31, wherein the storage capacitor line overlaps with a space between any adjacent two of the pixel electrodes in the column direction.

40. The active matrix substrate according to claim 31, further comprising a gate line extending in the row direction and intersecting with the source line, wherein the floating electrode overlaps with a storage capacitor line substantially only at an intersection of the storage capacitor line and the gate line.

41. The active matrix substrate according to claim 31, further comprising a storage capacitor line extending in the row direction and intersecting with the source line, wherein the floating electrode does not substantially overlap with the gate line.

42. The active matrix substrate according to claim 31, wherein the adjacent two row pixel electrodes are different in polarity.

43. The active matrix substrate according to claim 31, further comprising a gate line extending in the row direction and intersecting with the source line, wherein the gate line has a portion extending in the column direction and overlapping with the space between the adjacent two row pixel electrodes.

44. The active matrix substrate according to claim 31, further comprising a gate line extending in the row direction and intersecting with the source line, wherein the gate line and the floating electrode are disposed in the same layer.

45. The active matrix substrate according to claim 31, further comprising a gate line extending in the row direction and intersecting with the source line, wherein the gate line and the floating electrode are disposed in different layers with an insulating film therebetween.

46. The active matrix substrate according to claim 45, wherein the space between the adjacent two row pixel electrodes overlaps with at least one of the gate line and the floating electrode.

47. The active matrix substrate according to claim 31, wherein the gate line overlaps with a space between any adjacent two of the pixel electrodes in the column direction.

48. A liquid crystal display device, comprising:

the active matrix substrate according to claim 31;

a liquid crystal layer; and a counter substrate stacked in this order, wherein the counter substrate includes a black matrix overlapping with a space between any adjacent two of the pixel electrodes.

* * * * *